(12) United States Patent
Charitou et al.

(10) Patent No.: US 12,173,520 B2
(45) Date of Patent: Dec. 24, 2024

(54) PROP-BRACE COUPLER FOR CONSTRUCTION PLATFORM

(71) Applicant: George Charitou, King City (CA)

(72) Inventors: George Charitou, King City (CA); Mubashir Choudhry, Oakville (CA)

(73) Assignee: George Charitou, King City (CA)

( * ) Notice: Subject to any disclaimer, the term of this patent is extended or adjusted under 35 U.S.C. 154(b) by 450 days.

(21) Appl. No.: 17/496,005

(22) Filed: Oct. 7, 2021

(65) Prior Publication Data

US 2022/0112731 A1 Apr. 14, 2022

Related U.S. Application Data

(60) Provisional application No. 63/090,862, filed on Oct. 13, 2020.

(51) Int. Cl.
| | |
|---|---|
| *F16B 2/12* | (2006.01) |
| *E04G 5/06* | (2006.01) |
| *E04G 5/16* | (2006.01) |
| *E04G 7/14* | (2006.01) |
| *F16B 2/10* | (2006.01) |

(52) U.S. Cl.
CPC ............ *E04G 5/061* (2013.01); *E04G 5/165* (2013.01); *E04G 7/14* (2013.01); *F16B 2/10* (2013.01); *F16B 2/12* (2013.01)

(58) Field of Classification Search
CPC ...................................... F16B 2/10; F16B 2/12
USPC .............. 248/229.1, 229.13, 229.14, 229.15, 248/229.23, 229.24, 229.25
See application file for complete search history.

(56) References Cited

U.S. PATENT DOCUMENTS

| | | | | |
|---|---|---|---|---|
| 2,263,554 A | * | 11/1941 | Brach | H01Q 1/084 |
| | | | | 343/900 |
| 2,891,296 A | * | 6/1959 | Darde | F16L 3/243 |
| | | | | 248/74.1 |
| 4,221,419 A | * | 9/1980 | Riley | F16B 2/10 |
| | | | | 294/85 |
| 4,799,639 A | * | 1/1989 | Riley | F16G 15/04 |
| | | | | 24/522 |
| 2016/0355205 A1 | * | 12/2016 | Upton | F16M 11/08 |
| 2020/0030057 A1 | * | 1/2020 | Bellows | F16D 65/065 |

\* cited by examiner

*Primary Examiner* — Alfred J Wujciak
(74) *Attorney, Agent, or Firm* — George Likourezos; Carter, DeLuca & Farrell LLP

(57) ABSTRACT

A prop-brace coupler has a first section configured to be selectively connected to a vertical prop member of a construction platform that includes a vertical spacing member and a diagonal bracing member. The prop-brace coupler also has a second section configured to be selectively connected to the vertical spacing member and to the diagonal bracing member.

12 Claims, 11 Drawing Sheets

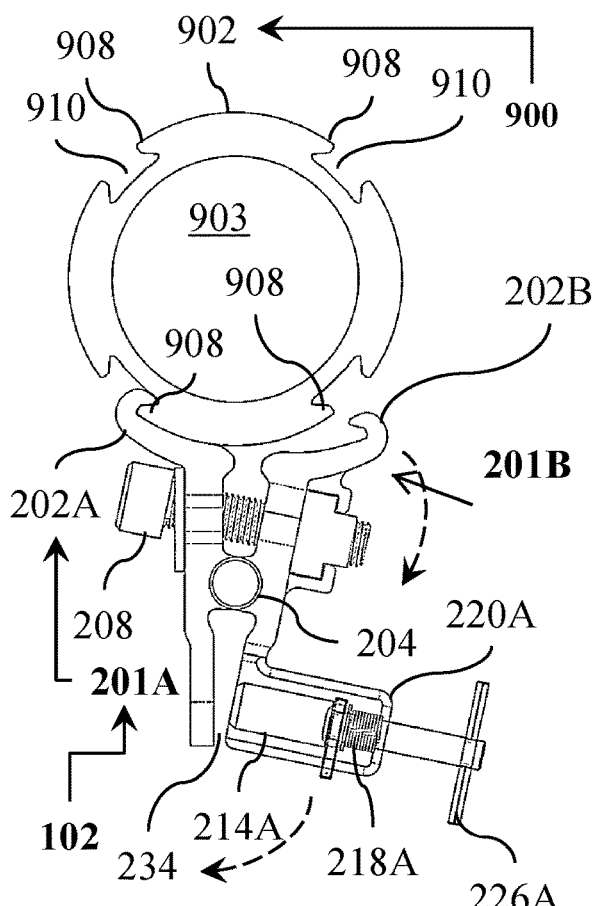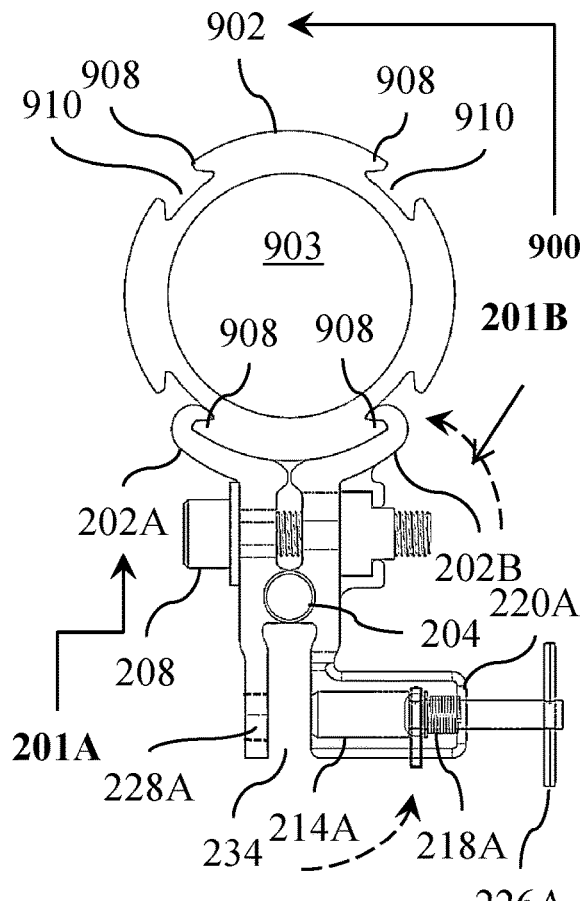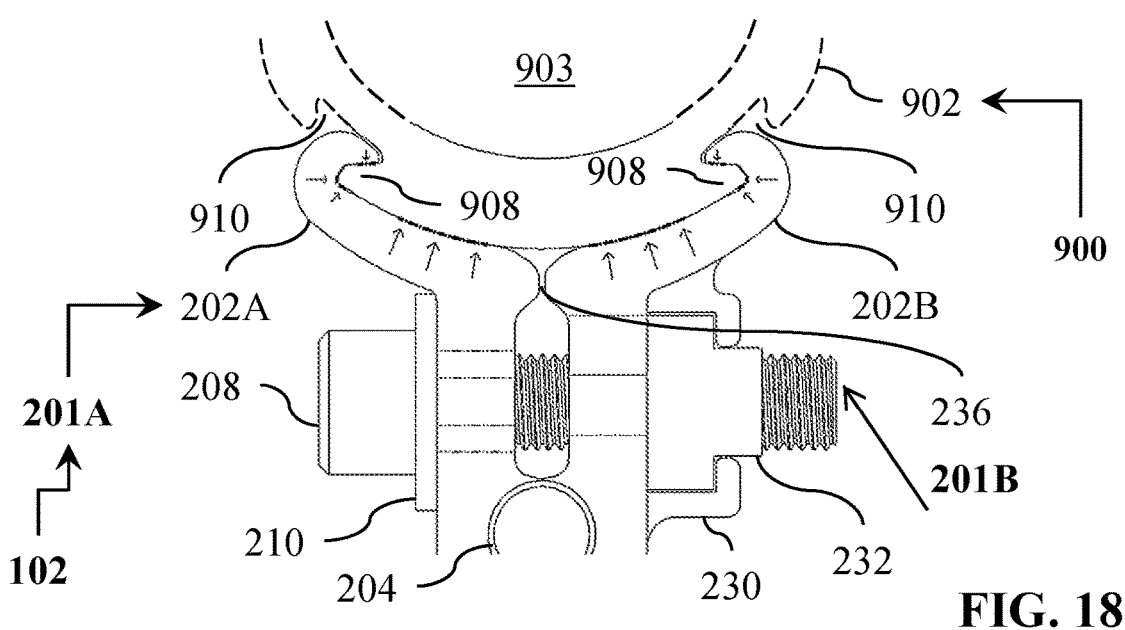

PROP-BRACE COUPLER FOR CONSTRUCTION PLATFORM

CROSS-REFERENCE TO RELATED APPLICATION

This application claims the benefit of and priority to U.S. Provisional Patent Application No. 63/090,862, filed on Oct. 13, 2020, the entire contents of which are incorporated by reference herein.

TECHNICAL FIELD

This document relates to the technical field of (and is not limited to) (A) a prop-brace coupler 102 for a construction platform 900 (and method therefor); and (B) a synergistic combination of a prop-brace coupler 102 and a construction platform 900 (and method therefor).

BACKGROUND

Shoring is a process of temporarily supporting a structure (such as a building, a vessel, a trench) with shores (also called props or supports) when there is a danger of collapse of the structure or during the construction, repair and/or alteration of the structure. Shoring may be vertical, angled, or horizontal. A prop (also called a prop assembly) is an object (also called a support) placed beneath or against a structure to keep the structure from falling or shaking.

SUMMARY

It will be appreciated that there exists a need to mitigate (at least in part) at least one problem associated with known systems for connecting elements of a construction platform (also called the existing technology). After much study of, and experimentation with, the existing (known) systems for connecting elements of a construction platform, an understanding (at least in part) of the problem and its solution have been identified (at least in part) and are articulated (at least in part) as follows:

Falsework (and any equivalent thereof) is defined as any temporary structure used to support a permanent structure while the permanent structure is not self-supporting. Formwork (and any equivalent thereof, such as a formwork platform or formwork system) is defined as a system of support for freshly placed concrete, including a mold device (also called a mould, etc.) sheathing, supporting members, hardware, and/or necessary bracing (but usually excluding the falsework). A shore (also called a prop) is a falsework component defined as a vertical or inclined support member designed to support the weight of the formwork, concrete, and construction loads.

To mitigate, at least in part, at least one problem associated with the existing technology, there is provided (in accordance with a major aspect) an apparatus. The apparatus is for a construction platform 900 including a vertical prop member 902, a vertical spacing member 904 and a diagonal bracing member 906. The apparatus includes and is not limited to (comprises) a prop-brace coupler 102 having a first or front section 301 (FIG. 12) configured to be selectively connected to the vertical prop member 902. The prop-brace coupler 102 also has a second or rear section 302 (FIG. 13) configured to be selectively connected to the vertical spacing member 904 and to the diagonal bracing member 906.

To mitigate, at least in part, at least one problem associated with the existing technology, there is provided (in accordance with a major aspect) an apparatus. The apparatus includes and is not limited to (comprises) a construction platform 900 including a vertical prop member 902, a vertical spacing member 904 and a diagonal bracing member 906. A prop-brace coupler 102 has a first section 301 configured to be selectively connected to the vertical prop member 902. The prop-brace coupler 102 also has a second section 302 configured to be selectively connected to the vertical spacing member 904 and to the diagonal bracing member 906.

The present disclosure provides a prop-brace coupler including a first clamp head having a clamp jaw at a front section thereof and a second clamp head movably coupled to the first clamp head. The second clamp head has a clamp jaw at a front section of the second clamp head. The first and second clamp heads are configured to move relative to one another between an expanded position, in which a surface feature of a vertical prop member of a construction platform is receivable between the clamp jaws, and a clamped position, in which the surface feature of the vertical prop member is grasped between the clamp jaws. Each of the first and second clamp heads has a rear section configured to be selectively connected to at least one of a vertical spacing member of the construction platform or a diagonal bracing member of the construction platform.

In aspects, the prop-brace coupler may further include a clamp bolt coupled to the first and second clamp heads at a location between the front and rear sections of the first and second clamp heads. The clamp bolt may be configured to selectively lock the first and second clamp heads in the clamped position.

In aspects, the clamp bolt may extend perpendicularly relative to a pivot axis about which the first and second clamp heads are configured to pivot.

In aspects, the prop-brace coupler may further include a first plunger pin movably supported on the rear section of the second clamp head and configured for receipt in a first plunge hole defined in the rear section of the first clamp head.

In aspects, the first plunger pin is configured to slide relative to the rear section of the second clamp head between a first position, in which an end of the first plunger pin is received in the first plunge hole, and a second position, in which the end of the first plunger pin is disposed outside of the first plunge hole and spaced away from the rear section of the first clamp head.

In aspects, the rear section of the second clamp head may include a first plunger-pin housing slidably supporting the first plunger pin therein.

In aspects, the first plunger-pin housing may define a guide channel, and the first plunger pin has a guide pin protruding outwardly from the first plunger pin that is configured for slidable receipt in the guide channel. The guide pin may be configured to rotate from an unlocked position, in which the first plunger pin is permitted to slide relative to the guide channel between the first and second positions, and a locked position, in which the first plunger pin is prevented from moving from the second position toward the first position.

In aspects, the prop-brace coupler may further include a pair of vertically-spaced plunger-pin housings extending laterally from the rear section of the second clamp head in a direction away from the rear section of the first clamp head. The prop-brace coupler may further include a pair of plunger pins respectively received in the pair of plunger-pin housings.

In aspects, the first plunger pin may be resiliently biased toward the first position.

In aspects, the first plunger pin may be configured for receipt in a channel defined in the vertical spacing member and/or a channel defined in the diagonal bracing member. The prop-brace coupler may further include a second plunger pin configured for receipt in a channel defined in another vertical spacing member and/or a channel defined in another diagonal bracing member.

In aspects, the first plunge hole may be configured for removable receipt of an end of the first plunger pin. The prop-brace coupler may further include a second plunge hole configured for removable receipt of an end of the second plunger pin.

In aspects, the clamp jaw of the second clamp head may include upper and lower jaws vertically spaced from one another a distance substantially equal to a height of the clamp jaw of the first clamp head.

In aspects, the rear sections of the first and second clamp heads may define a brace-receiver channel therebetween when the first and second clamp heads are in the clamped position.

In aspects, the clamp jaws may define an inspection opening between proximal ends thereof when the first and second clamp heads are in the clamped position. The inspection opening may be configured to permit a visual inspection of the clamp jaws to ensure that the clamp bolt is not over-tightened.

In accordance with another aspect of the present disclosure, a construction platform is provided that includes a vertical prop member, a first vertical spacing member, a first diagonal bracing member, and a first prop-brace coupler. The prop-brace coupler includes a front section configured to be selectively connected to the first vertical prop member, and a rear section configured to be selectively connected to the first vertical spacing member and the first diagonal bracing member.

In aspects, the front section may include a pair of clamp jaws configured to be selectively connected to a surface feature of the vertical prop member.

In aspects, the vertical prop member may define a plurality of vertically-extending grooves that are circumferentially spaced from one another around the vertical prop member. A first groove of the plurality of grooves may be configured for removable receipt of one clamp jaw of the pair of clamp jaws of the first prop-brace coupler. A second groove of the plurality of grooves may be configured for receipt of another clamp jaw of a second prop-brace coupler such that the first and second prop-brace couplers are positionable at the same vertical position as one another along the vertical prop member.

In aspects, the pair of clamp jaws may be configured to pivot relative to one another between an expanded position, in which the surface feature of the vertical prop member is receivable and vertically movable between the pair of clamp jaws, and a clamped position, in which the surface feature of the vertical prop member is grasped between the pair of clamp jaws to fix the first prop-brace coupler to the vertical prop member.

In aspects, the rear section of the first prop-brace coupler may define a brace-receiver channel when the pair of clamp jaws are in the clamped position. The brace-receiver channel may be configured for receipt of an end portion of the first diagonal bracing member and an end portion of a second diagonal bracing member.

In aspects, the first prop-brace coupler may include a first plunger pin slidably supported on the rear section of the first prop-brace coupler and configured to be selectively received in a channel defined in the first vertical spacing member and/or a channel defined in the first diagonal bracing member. The prop-brace coupler may further include a second plunger pin slidably supported on the rear section of the first prop-brace coupler and configured to be selectively received in a channel defined in a second vertical spacing member and/or a channel defined in the second diagonal bracing member.

In aspects, the rear section of the first prop-brace coupler may define a pair of plunge holes therein configured for removable receipt of corresponding ends of the first and second plunger pins.

Other aspects are identified in the claims. Other aspects and features of the non-limiting embodiments may now become apparent to those skilled in the art upon review of the following detailed description of the non-limiting embodiments with the accompanying drawings. This Summary is provided to introduce concepts in simplified form that are further described below in the Detailed Description. This Summary is not intended to identify potentially key features or possible essential features of the disclosed subject matter, and is not intended to describe each disclosed embodiment or every implementation of the disclosed subject matter. Many other novel advantages, features, and relationships will become apparent as this description proceeds. The figures and the description that follow more particularly exemplify illustrative embodiments.

BRIEF DESCRIPTION OF THE DRAWINGS

The non-limiting embodiments may be more fully appreciated by reference to the following detailed description of the non-limiting embodiments when taken in conjunction with the accompanying drawings, in which:

FIG. 16 is a top view of the prop-brace coupler and the construction platform of FIG. 1 with the clamp heads in an unclamped state;

FIG. 17 is a top view of the prop-brace coupler and the construction platform of FIG. 1 with the clamp heads in a clamped state;

FIG. 18 is an enlarged, top view of the prop-brace coupler and the construction platform of FIG. 17;

Figure 1:
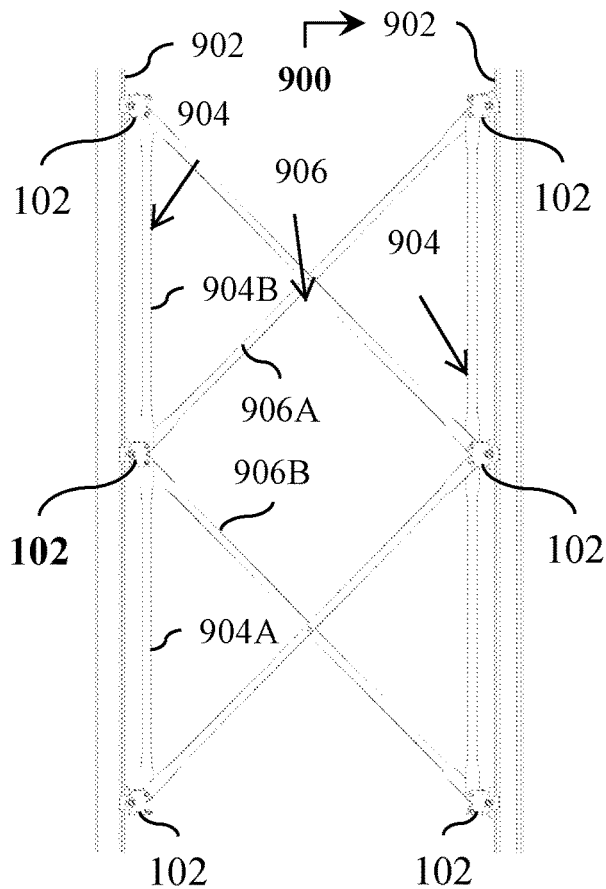
FIG. 1 is a side view of a prop-brace coupler and a construction platform in a first configuration.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted. Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, and well-understood, elements that are useful in commercially feasible embodiments are often not depicted to provide a less obstructed view of the embodiments of the present disclosure.

LISTING OF REFERENCE NUMERALS USED
IN THE DRAWINGS

| | |
|---|---|
| prop-brace coupler 102 | clamping-bolt washer 210 |
| clamp heads (201A, 201B) | bolt-receiver slots (212A, 212B) |
| clamp jaws (202A, 202B) | plunger pins (214A, 214B) |
| pivot member 204 | plunger-pin washers (216A, 216B) |
| connector receiver 205 | compression springs (218A, 218B) |
| pivot-pin receiver channels (206A, 206B) | plunger-pin housings (220A, 220B) |
| connector 207 | guide-pin channels (222A, 222B) |
| clamp bolt 208 | guide pins (224A, 224B) |
| plunger-pin handles (226A, 226B) | vertical prop member 902 |
| plunge holes (228A, 228B) | hollow interior 903 |
| T-slot nut receiver 230 | vertical spacing member 904 |
| T-slot nut 232 | channel 905 |
| brace receiver channel 234 | diagonal bracing member 906 |
| visual inspection zone 236 | channel 907 |
| first section 301 | prop flange 908 |
| second section 302 | prop groove 910 |
| construction platform 900 | |

DETAILED DESCRIPTION OF THE NON-LIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the disclosure is defined by the claims. For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the disclosure is limited to the subject matter provided by the claims, and that the disclosure is not limited to the particular aspects depicted and described. It will be appreciated that the scope of the meaning of a device configured to be coupled to an item (that is, to be connected to, to interact with the item, etc.) is to be interpreted as the device being configured to be coupled to the item, either directly or indirectly. Therefore, "configured to" may include the meaning "either directly or indirectly" unless specifically stated otherwise.

FIG. 1 depicts a side view of an embodiment (implementation) of a prop-brace coupler 102 and a construction platform 900.

Referring to the embodiment (implementation) as depicted in FIG. 1, the construction platform 900 includes spaced-apart vertical prop members 902 (also called props, vertically-extending prop members, etc.). The vertical prop members 902 may be manufactured via an extrusion process, and may be made of aluminum, etc. The vertical prop member 902 may be called an elongated prop or a prop extrusion, etc., manufactured by extruding aluminum. The vertical prop member 902 may be made of any suitable metal alloy, steel, etc. The vertical prop member 902 may include any outer-facing contour (outward-facing contour, a contour, etc.) configured to interface with the prop-brace coupler 102. Spaced-apart vertical spacing member 904 (also called, elongated vertical spacing members) are configured to be aligned and stacked one over the other in an end-to-end vertical relationship. Each vertical spacing members 904 includes an elongated section extending between end terminal portions. The spaced-apart vertical spacing members 904 are configured to vertically extend alongside the spaced-apart vertical prop members 902 (once positioned accordingly). The spaced-apart vertical spacing members 904 are positioned in a spaced-apart relationship to the spaced-apart vertical prop members 902 (once positioned accordingly).

Referring to the embodiment (implementation) as depicted in FIG. 1, the prop-brace coupler 102 is configured to securely attach an end terminal portion of the vertical spacing member 904 to a selected portion of the vertical prop member 902. The prop-brace coupler 102 is configured to securely attach an end terminal portion of at least one vertical spacing member 904 to a selected portion of the vertical prop member 902. For instance, the prop-brace coupler 102 is configured to securely attach an end terminal portion of a first vertical spacing member 904A and an end terminal portion of a second vertical spacing member 904B to a selected portion of the vertical prop member 902, in which the first vertical spacing member 904A and the second vertical spacing member 904B are positioned in a stacked relationship (end-to-end).

Referring to the embodiment (implementation) as depicted in FIG. 1, spaced-apart bracing members 906 are configured to diagonally extend between the spaced-apart vertical prop members 902. Each spaced-apart diagonal bracing member 906 includes an elongated section extending between end terminal portions. The prop-brace coupler 102 is configured to securely attach an end terminal portion of the diagonal bracing member 906 to a selected portion of the vertical prop member 902, in which the diagonal bracing member 906 is positioned in a diagonal alignment (relative to the alignment of the vertical prop member 902 or the first vertical spacing member 904). The prop-brace coupler 102 is configured to securely attach an end terminal portion of at least one diagonal bracing member 906 to a selected portion of the vertical prop member 902. For instance, the prop-brace coupler 102 is configured to selectively securely attach to: (A) an end terminal portion of a first vertical spacing member 904A, (B) an end terminal portion of a second vertical spacing member 904B, (C) an end terminal portion of a first diagonal bracing member 906A, (D) an end terminal portion of a second diagonal bracing member 906B, and/or (E) a selected portion of the vertical prop member 902. The first vertical spacing member 904A and the second vertical spacing member 904B are positioned in a stacked relationship (end-to-end). The end sections of the first and second vertical spacing members (904A, 904B) are configured to be coupled to the prop-brace coupler 102. The first diagonal bracing member 906A and the second diagonal bracing member 906B are positioned in a diagonal alignment. The end section of the first and second diagonal bracing members (906A, 906B) are configured to be coupled to the prop-brace coupler 102.

Figure 12:
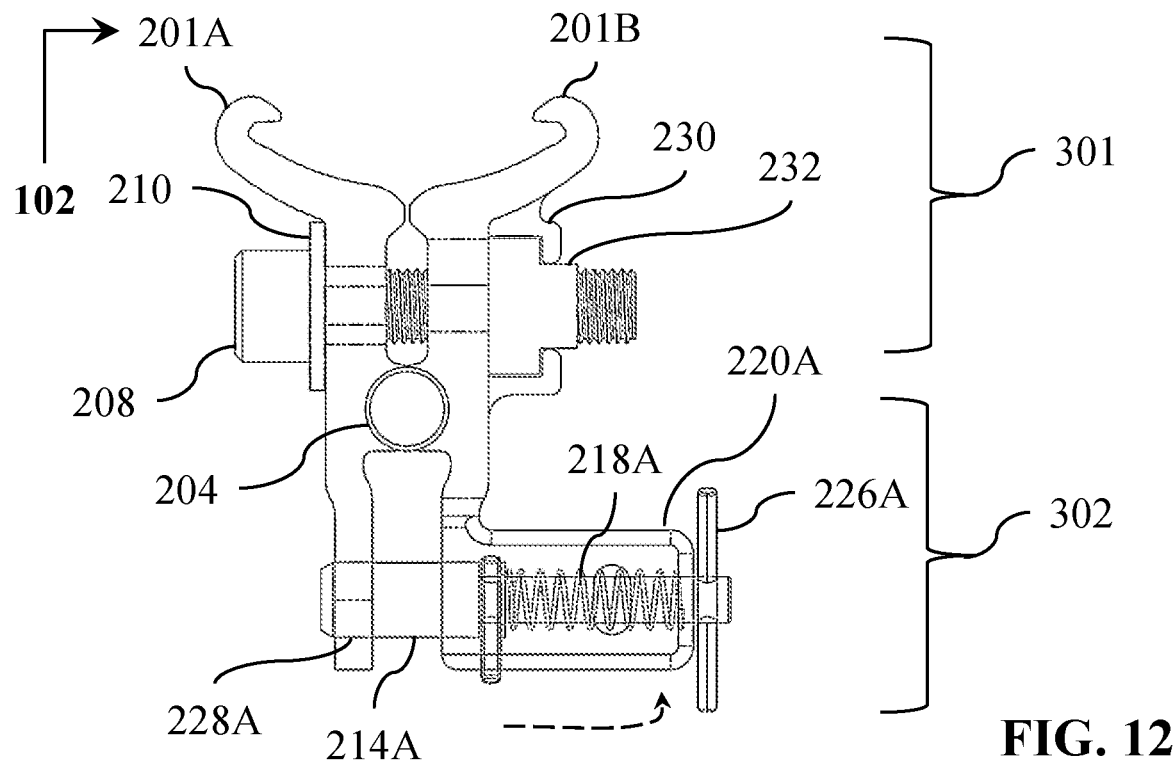
FIG. 12 is a top view of the prop-brace coupler of FIG. 5.
Figure 13:
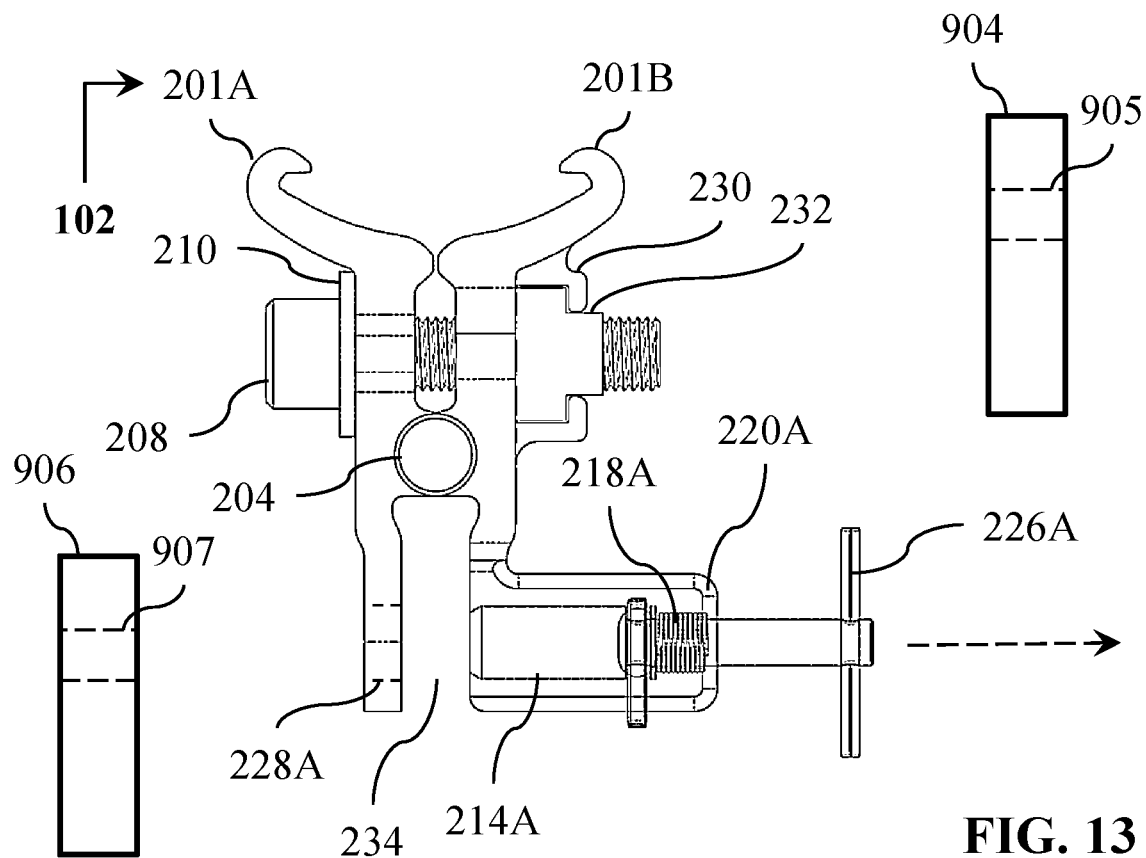
FIG. 13 is a top view of the prop-brace coupler of FIG. 5 shown in spaced relation to a vertical spacing member and a diagonal bracing member of the construction platform of FIG. 1.

Referring to the embodiment (implementation) as depicted in FIG. 1, more specifically, the end sections of the first and second vertical spacing members (904A, 904B) are configured to be coupled to a second section 302 of the prop-brace coupler 102 (as depicted in FIG. 12 and FIG. 13). More specifically, the end section of the first and second diagonal bracing members (906A, 906B) are configured to be coupled to the second section 302 of the prop-brace coupler 102 (as depicted in FIG. 12 and FIG. 13). The prop-brace coupler 102 has the first section 301 configured to be selectively connected to the vertical prop member 902. The prop-brace coupler 102 also has the second section 302 configured to be selectively connected to the vertical spacing member 904 and to the diagonal bracing member 906.

Referring to the embodiment (implementation) as depicted in FIG. 1, the prop-brace coupler 102 is configured to securely attach at least two adjacent vertical prop members 902 braced with the bracing members 906. The prop-brace coupler 102 is configured to be installed (that is, configured to selectively clamp or clamp down) on an outer geometry of (an aspect of) of the vertical prop member 902. The prop-brace couplers 102 are spaced apart from each other once installed. The prop-brace couplers 102 are configured to securely attach the bracing members 906 to the vertical prop members 902 at various positions along an outer perimeter of the vertical prop members 902. The prop-brace couplers 102 are configured to clamp down (preferably via clamp heads) on the outer geometry of the vertical prop member 902. The prop-brace couplers 102 are configured to receive and secure multiple bracing members. The prop-brace coupler 102 is configured to enable the bracing of one vertical prop member 902 to another adjacently-positioned vertical prop member 902 via the diagonal bracing members 906 that are securely installed to each prop-brace coupler 102 that clamps down on the vertical prop member 902. The prop-brace couplers 102 includes specific configurations (arrangements or features) that enable (facilitates) convenient and secure bracing of adjacently positioned vertical prop members 902. Multiple prop-brace couplers 102 may be clamped (attached) at multiple spaced-apart positions located along a length of the vertical prop member 902. The prop-brace coupler 102 is configured to circumferentially attach around the vertical prop member 902; this is done, preferably, at the same height (along the vertical length of the vertical prop member 902), thereby allowing at least one of the vertical prop members 902 to be braced, at a given height, from multiple directions.

Figure 2:
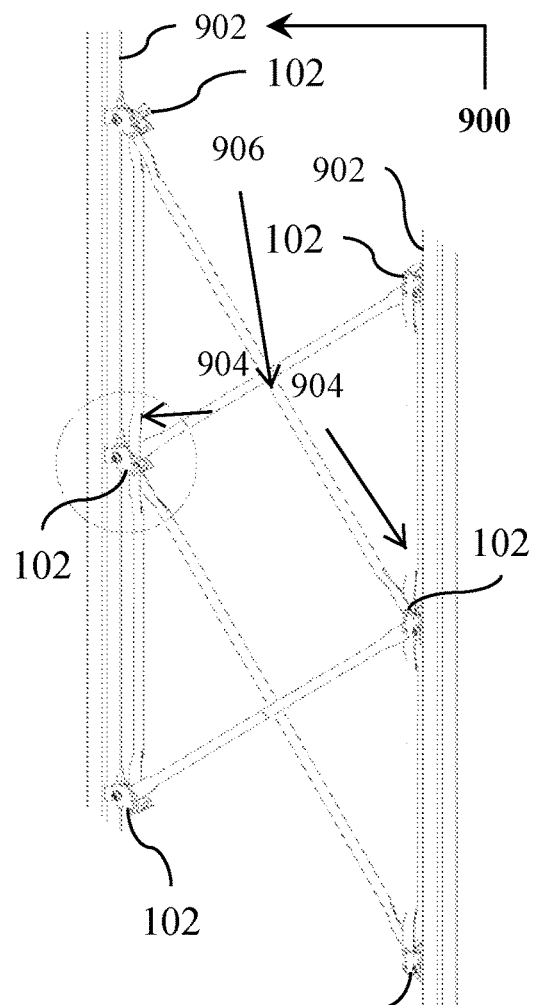
FIG. 2 is a perspective view of the prop-brace coupler and construction platform of FIG. 1.

FIG. 2 depicts a perspective view of an embodiment (implementation) of the prop-brace coupler 102 and the construction platform 900 of FIG. 1.

Referring to the embodiment (implementation) as depicted in FIG. 2, adjacently-positioned vertical prop members 902 are braced with the diagonal bracing member 906, and are installed to respective prop-brace couplers 102. The prop-brace couplers 102 are configured to clamp down on the outer geometry of the vertical prop member 902.

Figure 3:
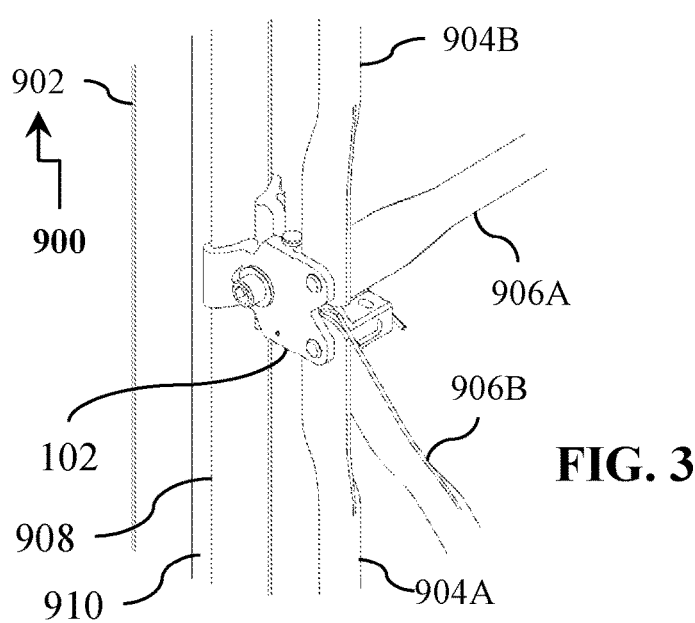
FIG. 3 an enlarged, perspective view of the prop-brace coupler and the construction platform of FIG. 1.

FIG. 3 depicts a close-up perspective view of an embodiment (implementation) of the prop-brace coupler 102 and the construction platform 900 of FIG. 2.

Referring to the embodiment (implementation) as depicted in FIG. 3 (FIG. 3 depicts a close-up view of FIG. 2), the vertical prop member 902 includes a prop flange 908 (also called an elongated prop flange) extending along an elongated length of the vertical prop member 902. The vertical prop member 902 includes a prop groove 910 (also called an elongated prop groove) formed along, and extending along, an elongated length of the vertical prop member 902. The prop flange 908 extends along an elongated side forming the prop groove 910.

Figure 4:
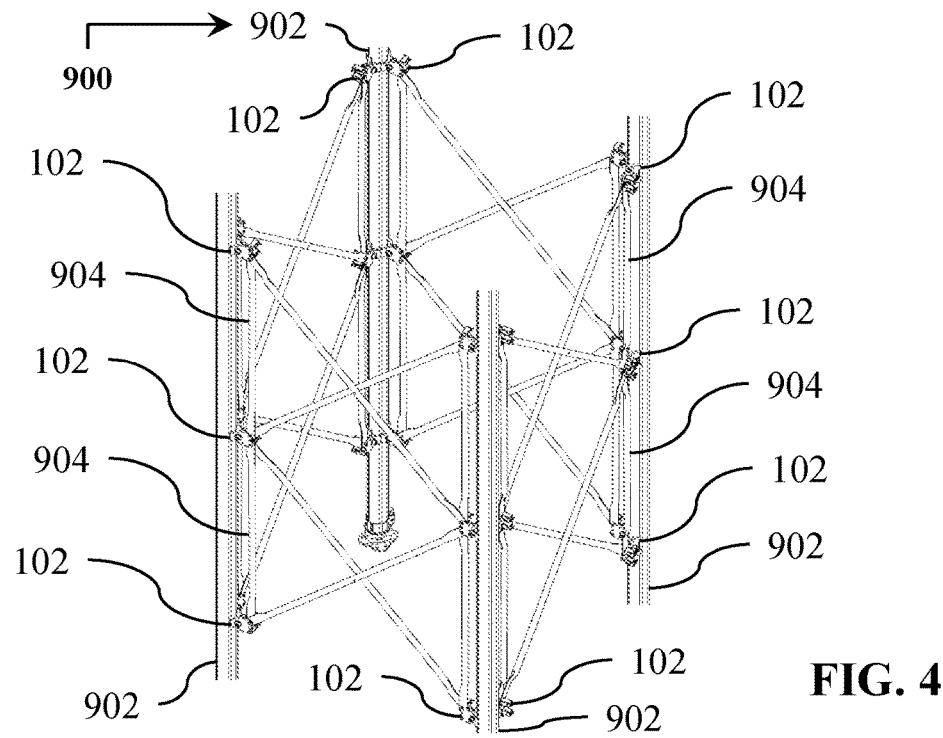
FIG. 4 is a perspective view of the prop-brace coupler and the construction platform of FIG. 1.

FIG. 4 depicts a perspective view of an embodiment (implementation) of the prop-brace coupler 102 and the construction platform 900 of FIG. 1.

Referring to the embodiment (implementation) as depicted in FIG. 4, the prop-brace couplers 102 may be used to brace each of the vertical prop members 902 from multiple directions to enable the formation of a rectangular-shaped structure (or a square-shaped structure) of a braced arrangement of the vertical prop members 902. The braced arrangement of the vertical prop member 902 may be called a tower, etc. Multiple prop-brace couplers 102 may be clamped at multiple positions circumferentially around the vertical prop member 902, preferably at the same height (that is, along a vertical elongated length of the vertical prop member 902), thereby allowing the vertical prop member 902 to be braced, at a given height, from multiple directions. The prop-brace couplers 102 allow the vertical prop member 902 to form a braced tower.

Figure 5:
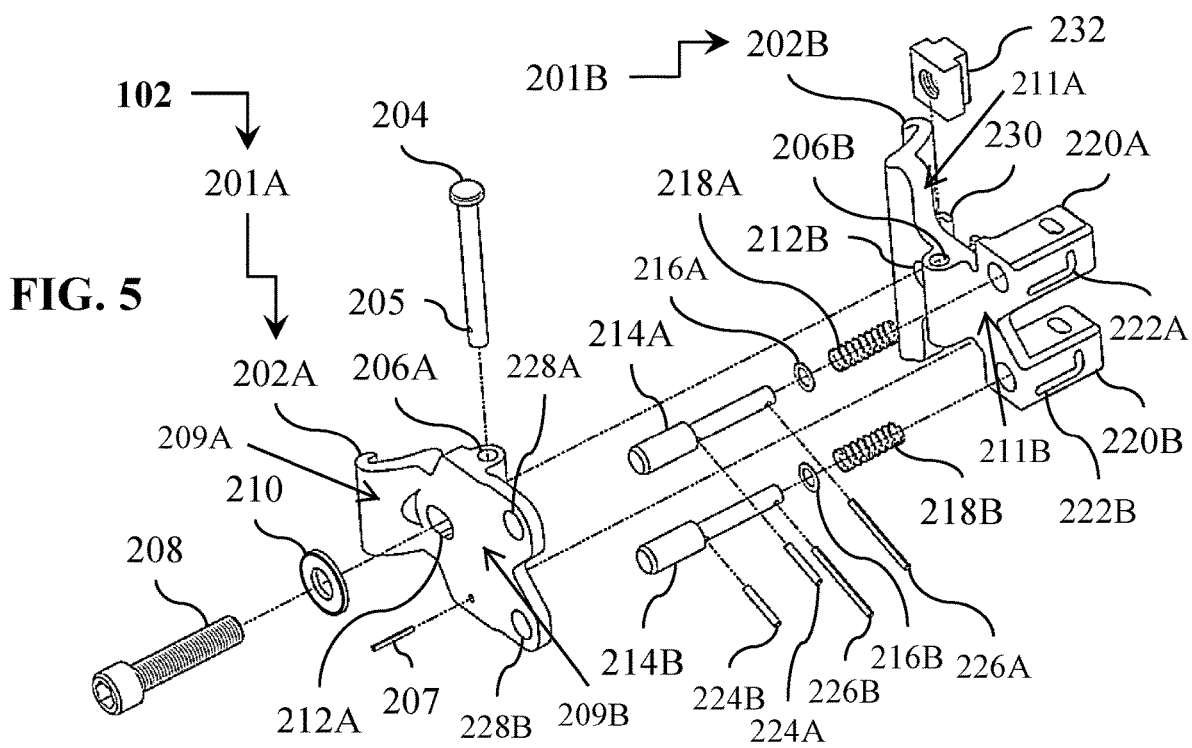
FIG. 5 is an exploded perspective view of the prop-brace coupler of FIG. 1.

FIG. 5 depicts an exploded perspective view of an embodiment (implementation) of the prop-brace coupler 102 of FIG. 1.

Referring to the embodiment (implementation) as depicted in FIG. 5, the prop-brace coupler 102 includes spaced apart clamp heads (201A, 201B). The prop-brace coupler 102 includes a first clamp head 201A and a second clamp head 201B. The first clamp head 201A includes a front section 209A and a rear section 209B, and the second clamp head 201B includes a front section 211A and a rear section 211B. The front sections 209A, 211A of the first clamp head 201A and the second clamp head 201B are configured to selectively attach (clamp) to at least one or more features of the vertical prop member 902 (as depicted in FIG. 16 to FIG. 24).

Referring to the embodiment (implementation) as depicted in FIG. 5, a pivot member 204 (also called a pivot pin) is located between the front and rear sections 209A, 211A and 209B, 211B of the first and second clamp heads 201A, 201B. The pivot member 204 is configured to pivotally attach the first clamp head 201A and the second clamp head 201B with each other. The front section 209A of the first clamp head 201A has a first clamp jaw 202A, and the front section 211A of the second clamp head 201B has a second clamp jaw 202B. The first and second clamp jaws 202A, 202B extend, respectively, from the first clamp head 201A and the second clamp head 201B (extend from one side of the pivot member 204). The first clamp head 201A defines a first pivot-pin receiver channel 206A. The second clamp head 201B defines a second pivot-pin receiver channel 206B. The first pivot-pin receiver channel 206A and the second pivot-pin receiver channel 206B are configured to be aligned with each other (once the first clamp head 201A and the second clamp head 201B are positioned proximate to each other). The pivot member 204 is configured to be slidably received in the first pivot-pin receiver channel 206A and the second pivot-pin receiver channel 206B (once the first pivot-pin receiver channel 206A and the second pivot-pin receiver channel 206B are aligned with each other); this is done in such a way that the pivot member 204 pivotally attaches the first clamp head 201A and the second clamp head 201B with each other.

Referring to the embodiment (implementation) as depicted in FIG. 5, the pivot member 204 includes, preferably, a pin connector receiver 205 positioned at a distal portion of the pivot member 204. The pin connector receiver 205 is configured to receive a pin connector 207 (also called a lock member). Once the pivot member 204 is received in the first pivot-pin receiver channel 206A and the second pivot-pin receiver channel 206B, the pin connector 207 is inserted into the pin connector receiver 205 to securely lock the position of the pivot member 204 to the first clamp head 201A and the second clamp head 201B, while permitting pivotal movement between the first clamp head 201A and the second clamp head 201B. The connector 207 (also called a slotted spring pin) is configured to fasten the pivot member 204 to the first clamp head 201A. It will be appreciated that any suitable structure may be utilized for securing the pivot member 204 to the first clamp head 201A. The slotted spring pin merely provides a convenient fastening approach from a manufacturing perspective.

Referring to the embodiment (implementation) as depicted in FIG. 5, the first clamp head 201A defines a first bolt-receiver slot 212A. The second clamp head 201B defines a second bolt-receiver slot 212B. The first bolt-receiver slot 212A and the second bolt-receiver slot 212B are configured to be aligned with each other. A clamp bolt 208 (preferably with a clamping-bolt washer 210) is configured to be received in the first bolt-receiver slot 212A and the second bolt-receiver slot 212B (once the first bolt-receiver slot 212A and the second bolt-receiver slot 212B are aligned with each other). The second clamp head 201B defines a T-slot nut receiver 230. The T-slot nut receiver 230 is configured to receive and support a T-slot nut 232. The T-slot nut 232 is configured to be threadably attached to the distal portion of the clamp bolt 208 (once the T-slot nut 232 is received and is supported by the T-slot nut receiver 230, and once the clamp bolt 208 is received in the first bolt-receiver slot 212A and the second bolt-receiver slot 212B). The T-slot nut receiver 230 is configured to slidably receive the T-slot nut 232, and then the clamp bolt 208 is inserted through (threaded to, coupled to) the T-slot nut 232.

Referring to the embodiment (implementation) as depicted in FIG. 5, the rear section 211B of the second clamp head 201B includes spaced-apart plunger-pin housings (220A, 220B). The spaced-apart plunger-pin housings (220A, 220B) extend laterally from the second clamp head 201B and away from the first clamp head 201A. The spaced-apart plunger-pin housings (220A, 220B) are positioned at one side of the pivot member 204 (e.g., rearward), and the spaced-apart clamp jaws (202A, 202B) are positioned at the opposite side of the pivot member 204 (e.g., frontward). The first plunger-pin housing 220A defines a first guide-pin channel 222A (also called a first L-shaped channel). The second plunger-pin housing 220B defines a second guide-pin channel 222B (also called a second L-shaped channel).

Referring to the embodiment (implementation) as depicted in FIG. 5, a first compression spring 218A is configured to be received in the first plunger-pin housing 220A. A second compression spring 218B is configured to be received in the second plunger-pin housing 220B. When the clamp heads (201A, 201B) are positioned in a closed configuration, the compression springs (218A, 218B), in use, force (bias or push) the plunger pins (214A, 214B) into the plunge holes (228A, 228B) of the first clamp head 201A. The plunge holes (228A, 228B) are defined in (formed in) the first clamp head 201A.

Referring to the embodiment (implementation) as depicted in FIG. 5, a first plunger-pin washer 216A is configured to be received in the first plunger-pin housing 220A. The first plunger-pin washer 216A is configured to abut the first compression spring 218A (that is held in the first plunger-pin housing 220A). A second plunger-pin washer 216B is configured to be received in the second plunger pin 214B. The second plunger-pin washer 216B is configured abut the second compression spring 218B (that is held in the second plunger-pin housing 220B).

Referring to the embodiment (implementation) as depicted in FIG. 5, a first plunger pin 214A is configured to be received in the first plunger-pin housing 220A. The first plunger pin 214A includes a first shoulder element configured to abut the first plunger-pin washer 216A (once the first plunger-pin washer 216A is received in the first plunger-pin housing 220A). A second plunger pin 214B is configured to be received in the second plunger pin housing 220B. The second plunger pin 214B includes a second shoulder element configured to abut the second plunger-pin washer 216B (once the second plunger-pin washer 216B is received in the second plunger-pin housing 220B).

Referring to the embodiment (implementation) as depicted in FIG. 5, the rear section 209B of the first clamp head 201A defines a first plunge hole 228A and a second plunge hole 228B. The first plunge hole 228A and the second plunge hole 228B are vertically spaced apart from each other. The first plunge hole 228A is configured to be aligned with the interior channel of the first plunger-pin housing 220A. The second plunge hole 228B is configured to be aligned with the interior channel of the second plunger-pin housing 220B. The first plunge hole 228A is configured to receive a distal portion of the first plunger pin 214A. The second plunge hole 228B is configured to receive a distal portion of the second plunger pin 214B.

Referring to the embodiment (implementation) as depicted in FIG. 5, the first guide pin 224A is configured to radially extend from the first plunger pin 214A. The first guide pin 224A is configured to be movable along the first guide-pin channel 222A of the first plunger-pin housing 220A (once the first guide pin 224A radially extends from the first plunger pin 214A and once the first plunger pin 214A is received in the first plunger-pin housing 220A). The guide pins (224A, 224B) are respectively fixed to each of the plunger pins (214A, 214B). The guide pins (224A, 224B) extend radially from the plunger pins (214A, 214B). A portion of the guide pins (224A, 224B) extend from, and travel along, the guide-pin channels (222A, 222B) of the plunger-pin housings (220A, 220B) of the second clamp head 201B.

Referring to the embodiment (implementation) as depicted in FIG. 5, the second guide pin 224B is configured to radially extend from the second plunger pin 214B. The second guide pin 224B is configured to be movable along the second guide-pin channel 222B of the second plunger-pin housing 220B (once the second guide pin 224B radially extends from the second plunger pin 214B and once the second plunger pin 214B is received in the second plunger-pin housing 220B).

Referring to the embodiment (implementation) as depicted in FIG. 5, a first plunger-pin handle 226A is configured to extend from a distal portion of the first plunger pin 214A once the first guide pin 224A is installed to the first plunger-pin housing 220A. A second plunger-pin handle 226B is configured to extend from a distal portion of the second plunger pin 214B once the second guide pin 224B is installed to the second plunger-pin housing 220B.

Referring to the embodiment (implementation) as depicted in FIG. 5, the clamp bolt 208 (when screwed down against the clamping-bolt washer 210) and the clamp jaws (202A, 202B) of the clamp heads (201A, 201B) are brought together, and a clamping force is created in response to engagement of the clamp jaws (202A, 202B) to a portion of the vertical prop member 902. During assembly of the prop-brace coupler 102, a portion of the thread of the clamp bolt 208 (at the tail end of the clamp bolt 208) is crimped after the clamp bolt 208 has been screwed into the threads of the T-slot nut 232; this is done so that the clamp bolt 208 cannot be (inadvertently) unscrewed so much as to disengage the clamp bolt 208 from the threads of the T-slot nut 232.

Figure 15:
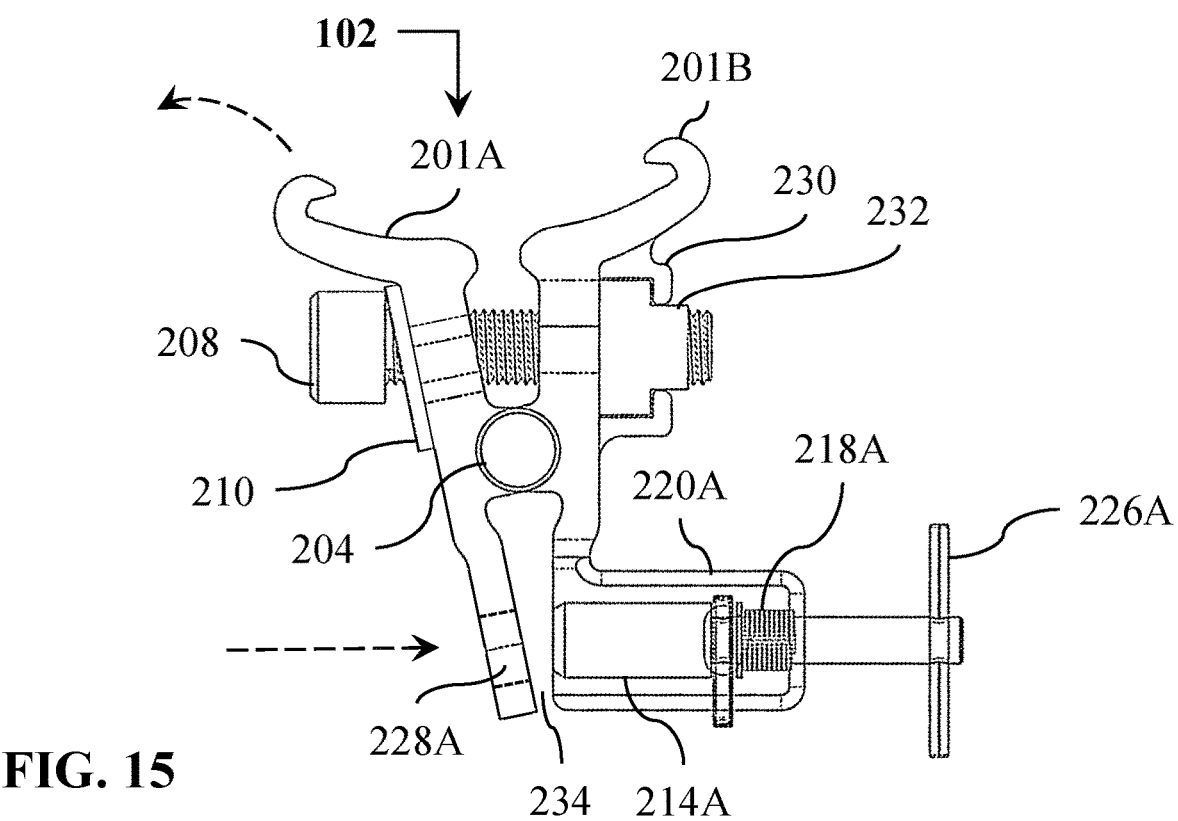
FIG. 15 is a top view of the prop-brace coupler of FIG. 5 with the clamp heads thereof in an unclamped state.

Referring to the embodiment (implementation) as depicted in FIG. 5, the spaced-apart bolt-receiver slots (212A, 212B) are configured to receive the clamp bolt 208. The clamp bolt 208 is configured to be fed through the bolt-receiver slots (212A, 212B). The clamp bolt 208 is attached to (threaded and screwed to threads of) the T-slot nut 232 positioned at the second clamp head 201B. Screwing the clamp bolt 208 down brings the clamp jaws (202A, 202B) of the clamp heads (201A, 201B) together. When the clamp bolt 208 is unscrewed, the bolt-receiver slots (212A, 212B) ensure that the first clamp head 201A may swing out (as depicted in FIG. 15). The shape of the bolt-receiver slots (212A, 212B) may form a slot and is not limited to a straight-through circular hole (such as, a cylindrical hole), in which case the first clamp head 201A may not be able to pivot around the pivot member 204 (pin) after the clamp bolt 208 is passed through such a cylindrical hole.

Referring to the embodiment (implementation) as depicted in FIG. 5, pulling on the plunger-pin handles (226A, 226B) may pull (respectively move) the plunger pins (214A, 214B) relative to the first clamp head 201A. The guide-pin channels (222A, 222B) are configured to guide movement of the guide pins (224A, 224B) that extend radially from the plunger pins (214A, 214B). The guide pins (224A, 224B) are fixed to the plunger pins (214A, 214B). The shape of the guide-pin channels (222A, 222B) may resemble an L-shaped channel with a horizontal portion and a shorter vertical portion. The plunger pins (214A, 214B) may be pulled back horizontally (thereby pulling the plunger pins (214A, 214B) out of the plunge holes (228A, 228B) of the first clamp head 201A). The plunger pins (214A, 214B) may be twisted or rotated, via rotational movement of the plunger-pin handles (226A, 226B), so that the guide pins (224A, 224B) may become trapped in the short vertical portion of the L-shaped instance of the guide-pin channels (222A, 222B). In this way, the plunger pins (214A, 214B) may remain pulled out of the plunge holes (228A, 228B) of the first clamp head 201A (this allows installation of the diagonal bracing member 906 (as depicted in FIG. 3) into the brace-receiver channel 234 (shown in FIG. 13 and FIG. 14)). It will be appreciated that the brace-receiver channel 234 is not a part of the bracing member 906. The brace-receiver channel 234 is an opening or a gap formed in the section 302, which opens up once the plunger pins (214A, 214B) are pulled out of their respective plunge holes (228A, 228B). It is in the brace-receiver channel 234 that the distal portion of the bracing member 906 may be inserted and then become pinned (connected or secured) to the prop-brace coupler 102, once the plunger pins (214A, 214B) are plunged back into the respective plunge holes (228A, 228B).

Figure 6:
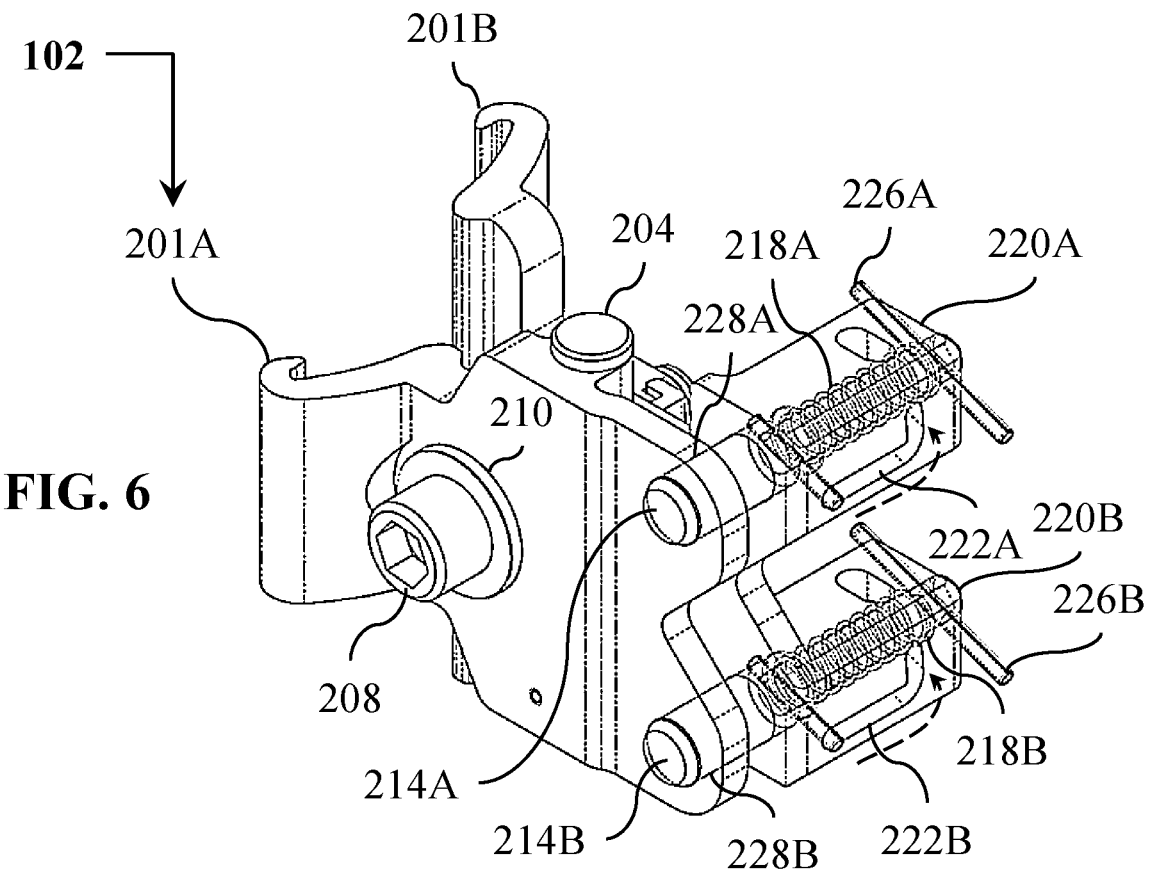
FIG. 6 is a rear, perspective view of the prop-brace coupler of FIG. 5.
Figure 7:
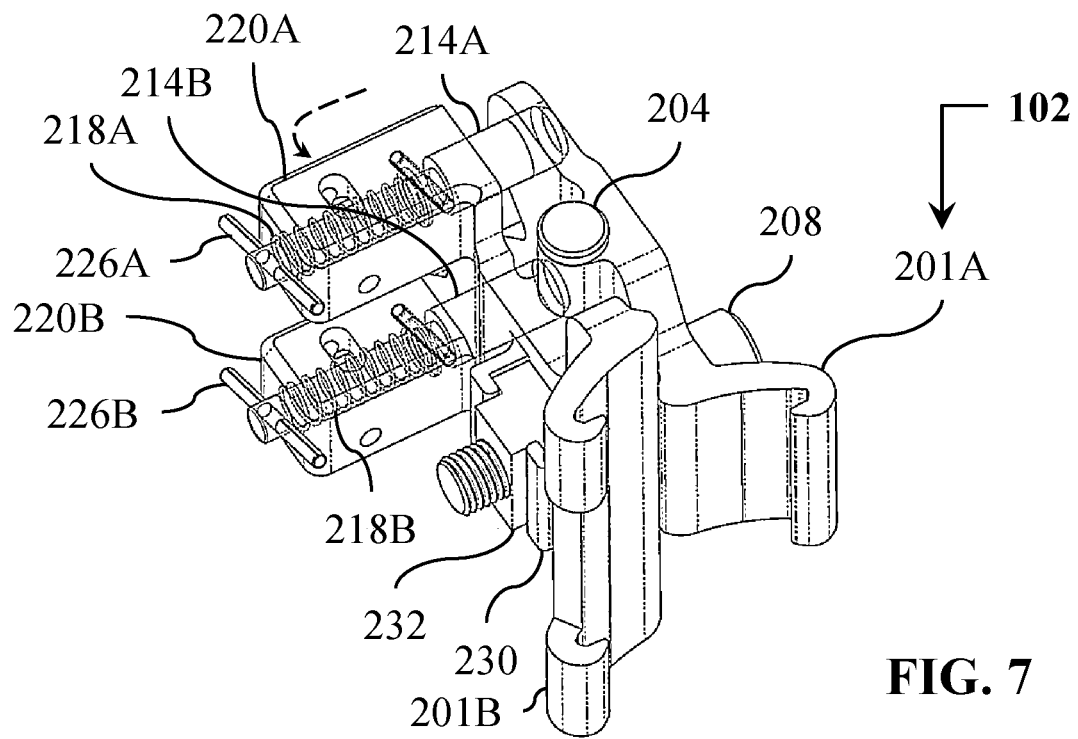
FIG. 7 is a front, perspective view of the prop-brace coupler of FIG. 5.

FIG. 6 and FIG. 7 depict perspective views of embodiments (implementations) of the prop-brace coupler 102 of FIG. 5.

Referring to the embodiments (implementations) as depicted in FIG. 6 and FIG. 7 (in which FIG. 6 and FIG. 7 depict the prop-brace coupler 102 in the same condition or state from different perspectives), the prop-brace coupler 102 is placed in a closed position (also called a closed condition or a locked condition). The clamp heads (201A, 201B) are closed together, and so the clamp heads (201A, 201B) cannot be opened or spread apart. The clamp jaws (202A, 202B) are locked in position (they are spaced apart from each other and are not able to be spread apart or moved together). The clamp bolt 208 is in a screwed-down position (an engaged position), and the clamp bolt 208 is fully screwed into the T-slot nut 232 (to achieve the locked condition). The plunger pins (214A, 214B) are received in (engaged with) their respective plunge holes (228A, 228B). The clamp heads (201A, 201B) cannot be pulled apart unless the plunger pins (214A, 214B) are retracted and the clamp bolt 208 is unscrewed from the T-slot nut 232.

Figure 8:
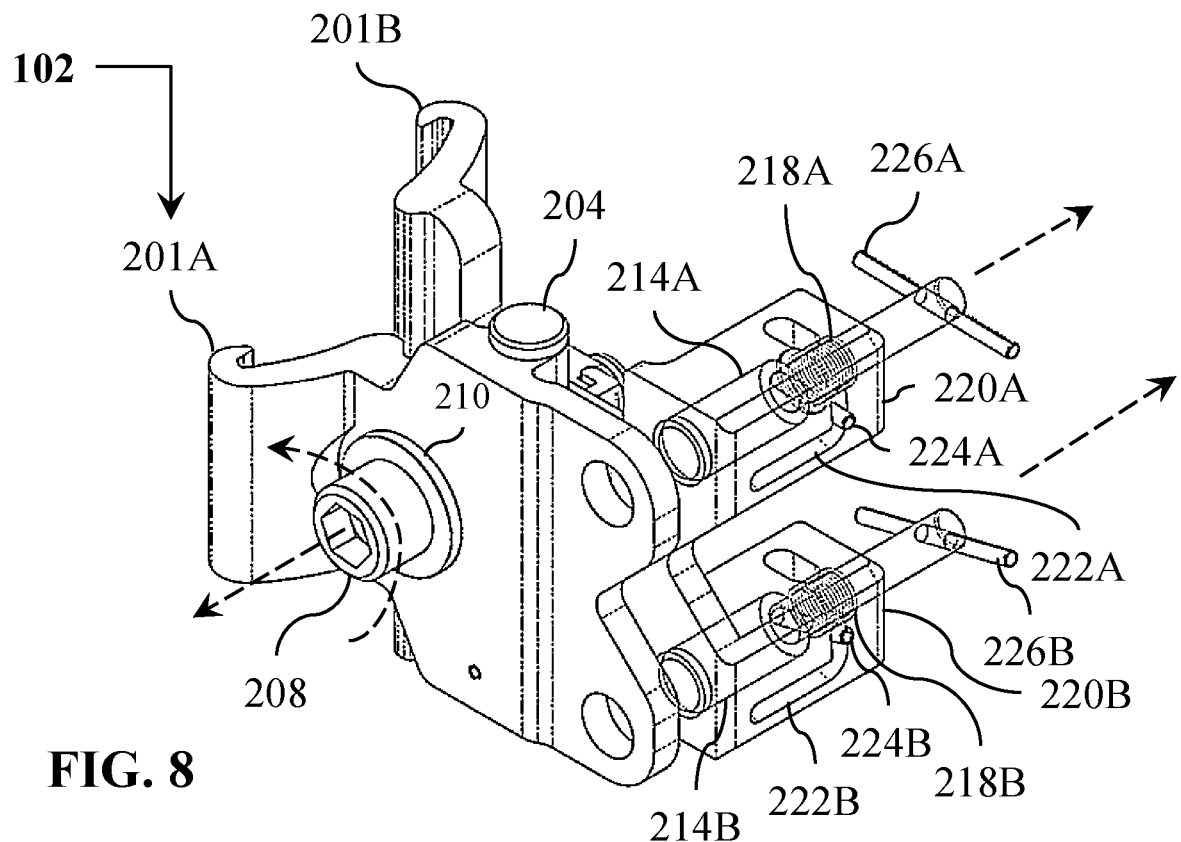
FIG. 8 is a rear, perspective view of the prop-brace coupler of FIG. 5 with plunger-pin handles thereof in an extended position.
Figure 9:
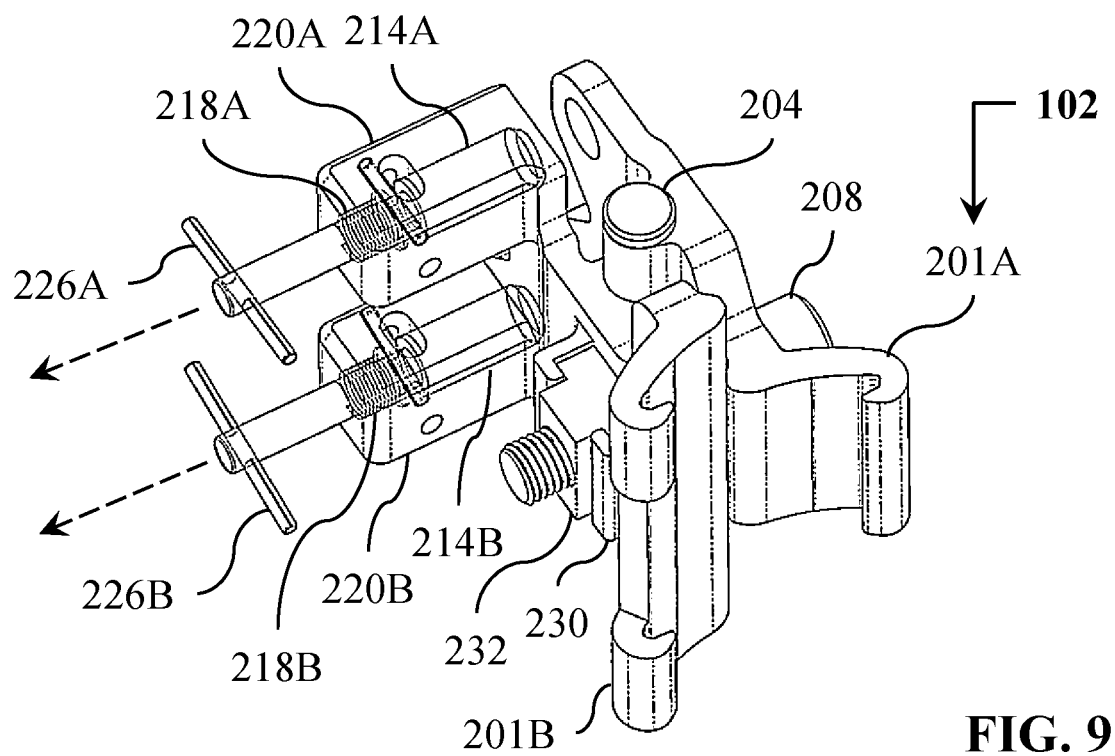
FIG. 9 is a front, perspective view of the prop-brace coupler of FIG. 5 with the plunger-pin handles thereof in the extended position.

FIG. 8 and FIG. 9 depict perspective views of embodiments (implementations) of the prop-brace coupler 102 of FIG. 5.

Referring to the embodiments (implementations) as depicted in FIG. 8 and FIG. 9 (in which FIG. 8 and FIG. 9 depict the prop-brace coupler 102 in the same condition or state from different perspectives), the plunger pins (214A, 214B) (of the prop-brace coupler 102) are retracted from (pulled out from) their respective plunge holes (228A, 228B). The guide pins (224A, 224B), which are fixed to the plunger pins (214A, 214B), are respectively guided in, and along, the guide-pin channels (222A, 222B) formed on the plunger-pin housings (220A, 220B). The guide-pin channels (222A, 222B) form, preferably, L-shaped channels (elbow-shaped channels) including a horizontal portion and a relatively shorter vertical portion. The plunger pins (214A, 214B) are pulled back (horizontally) thereby pulling them out of their respective plunge holes (228A, 228B), and then the plunger pins (214A, 214B) are rotated or twisted, via respective rotational movement of the plunger-pin handles (226A, 226B), so that the guide pins (224A, 224B) may become trapped in a portion of the guide-pin channels (222A, 222B); that is, the guide pins (224A, 224B) may become trapped in the relatively shorter vertical portion of the L-shaped channel. The plunger pins (214A, 214B) remain pulled out from their respective plunge holes (228A, 228B) until the plunger-pin handles (226A, 226B) are rotated or twisted in the other direction (the opposite rotational direction); this is done so that the guide pins (224A, 224B) may enter another portion of the guide-pin channels (222A, 222B); that is, the guide pins (224A, 224B) may be moved to enter the horizontal portion of the guide-pin channels (222A, 222B). After this movement is completed, the compression springs (218A, 218B) push against the guide pins (224A, 224B), thereby forcing the plunger pins (214A, 214B) to plunge back into (to move into) their respective plunge holes (228A, 228B).

Referring to the embodiments (implementations) as depicted in FIG. 8 and FIG. 9, the clamp bolt 208 is in a screwed-down position (that is, it is fully connected to the T-slot nut 232), and therefore the clamp heads (201A, 201B) cannot yet be opened as depicted. To open the clamp heads (201A, 201B), the clamp bolt 208 may be rotated away from (unscrewed from) the T-slot nut 232, thereby allowing the clamp heads (201A, 201B) to pivot relative to the pivot member 204.

Referring to the embodiments (implementations) as depicted in FIG. 8 and FIG. 9, it will be appreciated that the depictions of FIG. 8 and FIG. 9 are not the same as the depictions of FIG. 6 and FIG. 7. As depicted in FIG. 8 and FIG. 9, the plunger pins (214A, 214B) have been retracted from their respective plunge holes (228A, 228B). In sharp contrast to the depiction in FIG. 6 and FIG. 7, the plunger pins (214A, 214B) are retracted and stay or remain in a retracted position (as depicted in FIG. 8 and FIG. 9).

Figure 10:
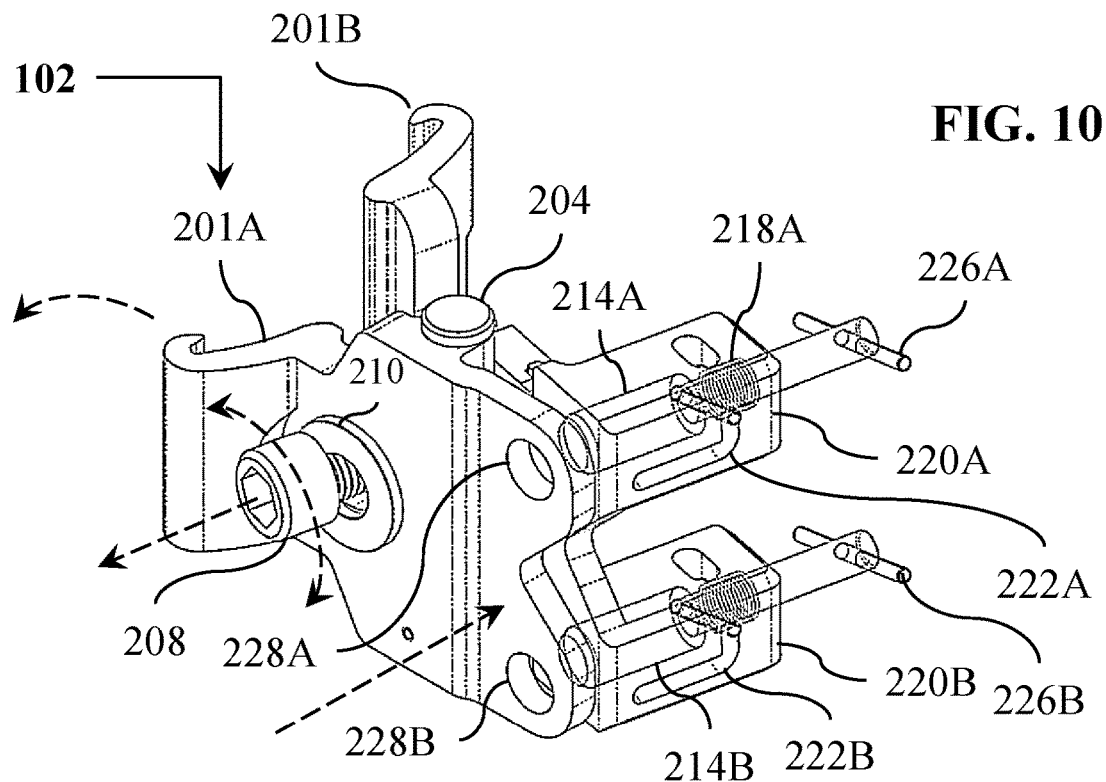
FIG. 10 is a rear, perspective view of the prop-brace coupler of FIG. 5 with a clamp bolt thereof being unscrewed.
Figure 11:
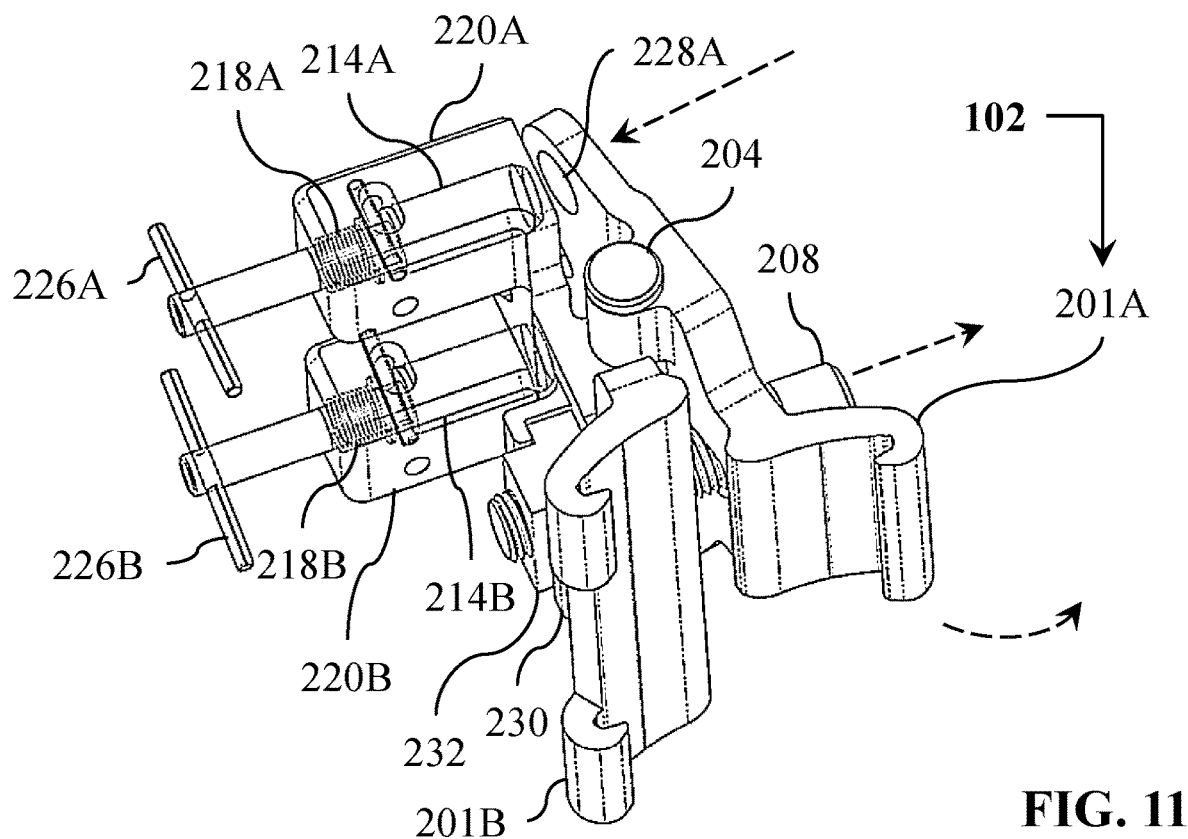
FIG. 11 is a front, perspective view of the prop-brace coupler of FIG. 5 with the clamp bolt thereof being unscrewed.

FIG. 10 and FIG. 11 depict perspective views of embodiments (implementations) of the prop-brace coupler 102 of FIG. 5.

Referring to the embodiments (implementations) as depicted in FIG. 10 and FIG. 11, the clamp heads (201A, 201B) of the prop-brace coupler 102 are placed in an open condition (unlocked condition), in which the prop-brace coupler 102 may be installed to, or removed from, the vertical prop member 902 (as depicted in FIG. 3). The plunger pins (214A, 214B) have been retracted from their respective plunge holes (228A, 228B). The clamp bolt 208 has been unscrewed (at least in part) from the T-slot nut 232, thereby allowing the clamp heads (201A, 201B) to swivel (pivot) into the open condition.

FIG. 12 to FIG. 15 depict top views of embodiments (implementations) of the prop-brace coupler 102 of FIG. 5. FIG. 12 to FIG. 15 depict a sequence of steps by which the clamp heads (201A, 201B) may be opened for installation to, or removal from, the vertical prop member 902 of FIG. 3.

Figure 19:
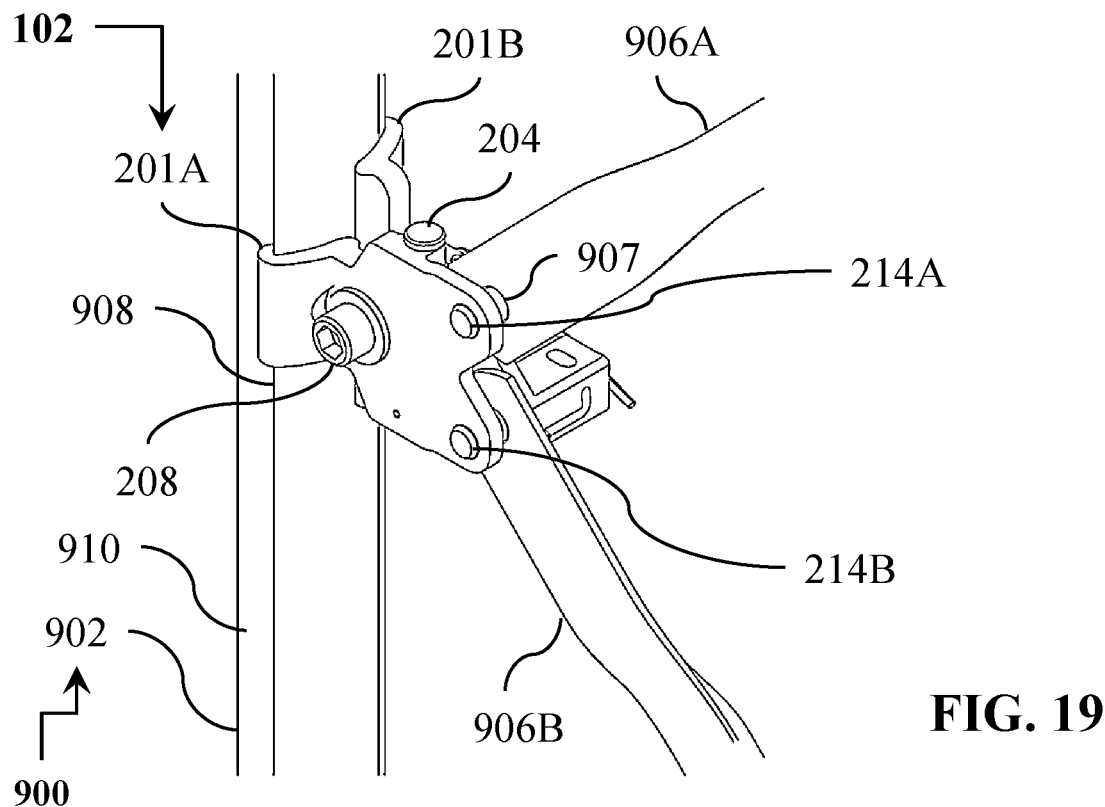
FIG. 19 is a perspective view of the prop-brace coupler attached to the construction platform.

Referring to the embodiment (implementation) as depicted in FIG. 12, there is depicted a top view of the embodiment as depicted in FIG. 6 and FIG. 7. The prop-brace coupler 102 has a first section 301 configured to be selectively connected to the vertical prop member 902 (as depicted in FIG. 3). The prop-brace coupler 102 also has a second section 302 configured to be selectively connected to the vertical spacing member 904 and to the diagonal bracing member 906 (as depicted in FIG. 3). The first section 301, preferably, includes a clamp head (201A, 201B) configured to be selectively securely connected to an outer-facing feature (also called a surface feature, an outward-facing feature, an outwardly exposed feature, an exposed feature, a contour, etc.) of the vertical prop member 902 (as depicted in FIG. 16). The second section 302, preferably, includes a plunger pin (214A, 214B) configured to be selectively securely coupled to a channel 905 formed through the vertical spacing member 904 (as depicted in FIG. 3 or FIG. 13). The second section 302 includes a plunger pin (214A, 214B) configured to be selectively securely coupled to a channel 907 formed through the diagonal bracing member 906 (as depicted in FIGS. 3, 13, and 19).

Referring to the embodiment (implementation) as depicted in FIG. 13, FIG. 13 depicts a top view of the embodiment as depicted in FIG. 8 and FIG. 9. The plunger pins (214A, 214B) of the prop-brace coupler 102 have been retracted from (pulled out from) their respective plunge holes (228A, 228B). Pulling the plunger pins (214A, 214B) away from their respective plunge holes (228A, 228B) permits the formation of a brace receiver channel 234 (an unobstructed opening). The brace receiver channel 234 is configured to receive an end portion of the diagonal bracing member 906 (as depicted in FIG. 3). The end portion of the diagonal bracing member 906 defines a channel 907 configured to receive the plunger pins (214A, 214B). Once the end portion (of the diagonal bracing member 906) is received in the brace receiver channel 234, the channel 907 (formed in the end portion of the diagonal bracing member 906) may be aligned with at least one of the plunge holes (228A, 228B), and the plunger pins (214A, 214B) may be moved into the channel 907 and back into their respective plunge holes (228A, 228B); in this manner or arrangement, the end portion of the diagonal bracing member 906 may be captured in response to retraction of the plunger pin 214A into the plunge hole 228A (for instance). It will be appreciated that once the diagonal bracing member 906 is moved into the brace receiver channel 234, the plunger pins (214A, 214B) are plunged back into their respective plunge holes (228A, 228B) of the first clamp head 201A. Each diagonal bracing member 906 has a corresponding channel or hole 907 (formed at the distal section of the diagonal bracing member 906) through which at least one of the plunger pins (214A, 214B) may pass, thereby holding the diagonal bracing member 906 in place and preventing the diagonal bracing member 906 from being pulled away from the prop-brace coupler 102. Once at least one of the plunger pins (214A, 214B) is retracted and pulled out of its respective plunge holes (228A, 228B), the brace receiver channel 234 becomes unobstructed and the diagonal bracing member 906 may be installed, after which the plunger pins (214A, 214B) are plunged through the channel 907 (also called a receiver hole) formed in the diagonal bracing member 906 and into the plunge holes (228A, 228B) of the first clamp heads 201A. In a similar manner, the brace receiver channel 234 is configured to receive an end portion of the vertical spacing member 904, as shown in FIG. 3.

Figure 14:
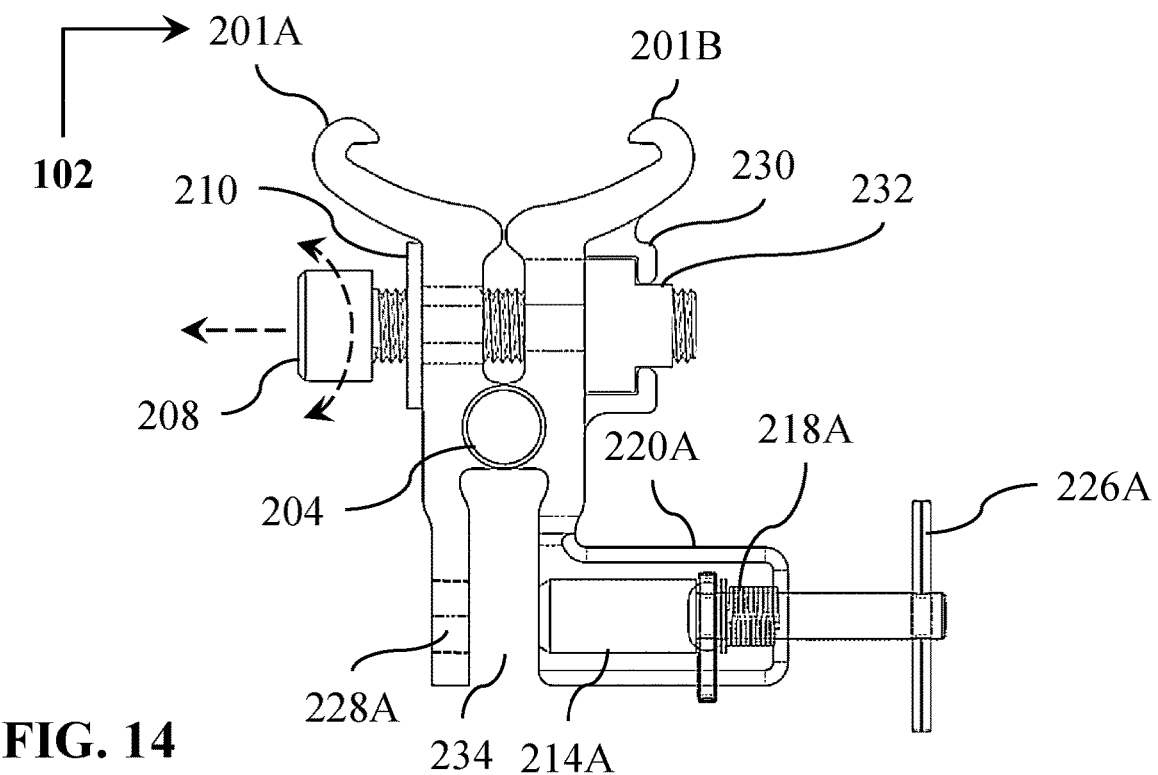
FIG. 14 is a top view of the prop-brace coupler of FIG. 5 with clamp heads thereof in a clamped state.

Referring to the embodiment (implementation) as depicted in FIG. 14, the prop-brace coupler 102 is depicted in the configuration for the clamp heads (201A, 201B) to open or spread apart (when the prop-brace coupler 102 is to be installed to, or removed from, the vertical prop member 902). The plunger pins (214A, 214B) have been retracted from (pulled out from) their respective plunge holes (228A, 228B), and the clamp bolt 208 has been unscrewed (at least in part, from the T-slot nut 232). The clamp heads (201A, 201B) may now be swung out into the open position (as depicted in FIG. 15). It will be appreciated that the embodiment depicted in FIG. 14 is not the same as the embodiment depicted in FIG. 13 (although they may appear to be similar). Referring to FIG. 13, the plunger pins (214A, 214B) are retracted, but the clamp bolt 208 is screwed down to (threaded into) the T-slot nut 232. Referring to FIG. 14, the plunger pins (214A, 214B) are retracted and the clamp bolt 208 has been unscrewed or disengaged (at least in part) from the T-slot nut 232, allowing the clamp heads (201A, 201B) to swing out (that is, allowing them to pivot relative to each other). When the clamp bolt 208 is disengaged and the plunger pins (214A, 214B) are retracted, the clamp heads (201A, 201B) may swing out (after which the prop-brace coupler 102 may be installed to, or removed from, the vertical prop member 902). Preferably, the thread at the end of the clamp bolt 208 is crimped thereby preventing the clamp bolt 208 from becoming unscrewed out of (removed from) the T-slot nut 232. It will be appreciated that the clamp bolt 208 has been unscrewed (at least in part) from the T-slot nut 232, which is different from what is depicted in FIG. 13. It will be appreciated that a clearance is formed in the brace receiver channel 234, allowing the clamp heads (201A, 201B) to swing out (pivot). It will be appreciated that the clamp heads 201A/B are configured to swing out (pivot), and the brace receiver channel 234 becomes unobstructed, which allows the clamp heads (201A, 201B) to pivot once the clamp bolt 208 has been unscrewed, at least in part, and the plunger pins (214A, 214B) have been retracted from the plunge holes (228A, 228B). The channel 907 in the bracing members 906 provides a passageway through which the plunger pins (214A, 214B) in the prop-brace coupler 102 may pass in order to connect the bracing members 906 to the prop-brace coupler 102, thereby preventing the bracing members 906 from being pulled away from the prop-brace coupler 102. Similarly, the channel 905 (FIG. 13) defined in each of the first and second vertical spacing members 904A, 904B provides a passageway through which the respective plunger pins 214A, 214B of the prop-brace coupler 102 may pass in order to connect the first and second vertical spacing member 904A, 904B to the prop-brace coupler 102, as shown in FIG. 3.

Referring to the embodiment (implementation) as depicted in FIG. 15 (which depicts a top view of the embodiments as depicted in FIG. 10 and FIG. 11), the prop-brace coupler 102 is placed in the open condition for when the prop-brace coupler 102 is to be installed to, or to be removed from, the vertical prop member 902 (as depicted in FIG. 3). The plunger pins (214A, 214B) have been retracted from (pulled out from) their respective plunge holes (228A, 228B), and the clamp bolt 208 has been unscrewed (at least in part) from the T-slot nut 232, and the clamp heads (201A, 201B) have been swung apart into the open position.

FIG. 16 depicts a top view of an embodiment (implementation) of the prop-brace coupler 102 and the construction platform 900 of FIG. 1.

Referring to the embodiment (implementation) as depicted in FIG. 16, when the clamp heads (201A, 201B) are placed in the open condition, the prop brace coupler 102 may be installed to, or removed from, the vertical prop member 902. The vertical prop member 902 defines, preferably, a hollow interior 903. The prop groove 910 is formed on an exterior surface of the vertical prop member 902. Prop flanges 908 are placed on (located at) the opposite lateral sides of the prop groove 910, in which the spaced-apart prop flanges 908 extend, at least in part, toward each other. The clamp heads (201A, 201B) are configured to respectively engage the prop flanges 908 (the prop flanges 908 are associated with, or located at, respective spaced-apart prop grooves 910). For instance, the first clamp jaw 202A (of the first clamp head 201A) may be positioned to engage a first prop flange 908, while the second clamp jaw 202B (of the second clamp head 201B) remains disengaged from (not engaged with) a second prop flange 908, etc. In this orientation, (A) the prop-brace coupler 102 may be detached and pulled away from the vertical prop member 902 (as in during the dismantling of the tower structure as depicted in FIG. 4) or (B) the second clamp head 201B may be swung in, and around, a corresponding prop flange 908 (as in during the installation of the tower structure as depicted in FIG. 4). Once the second clamp head 201B engages a corresponding prop flange 908 (as depicted in FIG. 17), the clamp bolt 208 may be tightened to the T-slot nut 232 to cause the clamp heads (201A, 201B) to clamp down on the prop flanges 908, thereby securing the prop-brace coupler 102 to the vertical prop member 902. Once the prop-brace coupler 102 has been secured to the vertical prop member 902, at least one instance, or two instances, of the diagonal bracing member 906 (and at least one instance, or two instances, of the vertical spacing member 904) may be installed to the prop-brace coupler 102.

FIG. 17 depicts a top view of an embodiment (implementation) of the prop-brace coupler 102 and the construction platform 900 of FIG. 1.

Referring to the embodiment (implementation) as depicted in FIG. 17, the prop-brace coupler 102 is installed to (clamps down on) the outer-facing contours or contours (such as the prop flanges 908, etc.) of the vertical prop member 902. The clamp bolt 208 has been screwed down (into the T-slot nut 232), which brings the clamp heads (201A, 201B) together, with the clamp heads (201A, 201B) engaging around (clamps down on) the outer geometry (such as, the prop flanges 908) of the vertical prop member 902. The plunger pins (214A, 214B) are placed in a retracted position to allow the bracing members 906A, 90B (as depicted in FIGS. 3 and 4) to be installed to the prop-brace coupler 102. Once the bracing members 906A, 906B are installed to the prop-brace coupler 102, the plunger pins (214A, 214B) may be plunged (moved) back into their respective plunge holes (228A, 228B) located on the first clamp head 201A and the channel 907 (FIG. 19) of each of the diagonal bracing members 906A, 906B. The vertical spacing members 904A, 904B may also be installed to the prop-brace coupler 102 in a manner similar to how the diagonal bracing member 906A, 906B are installed to the prop-brace coupler 102 (FIG. 3).

FIG. 18 depicts a close-up top view of an embodiment (implementation) of the prop-brace coupler 102 and the construction platform 900 of FIG. 1.

Referring to the embodiment (implementation) as depicted in FIG. 18 (which depicts a close-up view of FIG. 17), the clamp heads (201A, 201B) are securely engaged with (are clamping down on) the vertical prop member 902. The geometries and/or exterior surface profiles of the clamp heads (201A, 201B) are in intimate (close) contact with the geometries and/or exterior surface of the vertical prop member 902. The geometries and/or exterior surfaces of the clamp heads (201A, 201B) and/or the vertical prop member 902 are such that certain contact surfaces of the vertical prop member 902 may undergo (receive) a compressive load that is transmitted from the clamp heads (201A, 201B), while other contact surfaces of the vertical prop member 902 may undergo (receive) a tensile load that is transmitted from the clamp heads (201A, 201B). The specific contacting and/or mating geometries and/or the resulting load transfer behaviour ensure that, preferably under maximum permitted loads, the material stresses (mechanical stresses) in the components are below safety-factored limits. The dashed-line curves indicate areas of surface contact. The arrows indicate the general direction of forces that are transmitted to the vertical prop member 902. A visual inspection zone 236 (also called a clearance zone or opening) is formed (located) between the geometry of the clamp heads (201A, 201B). When the clamp heads (201A, 201B) are closed and engaged around (are clamping down on) the vertical prop member 902, the visual inspection zone 236 is formed, and may be visually inspected to ensure that the clamp bolt 208 has not been over-torqued to the T-slot nut 232. If the visual inspection zone 236 (the clearance zone) becomes zero, in which case the clamp heads (201A, 201B) touch each other within the visual inspection zone 236, the clamp bolt 208 has been over-tightened. The visual inspection zone 236 provides a feature that allows users to perform a visual inspection to ensure the prop-brace coupler 102 is optimally installed, and is not arranged to inflict damage to the vertical prop member 902.

FIG. 19 depicts a perspective view of an embodiments (implementation) of the prop-brace coupler 102 and the construction platform 900 of FIG. 1.

Referring to the embodiment (implementation) as depicted in FIG. 19, the prop-brace coupler 102 is installed to the vertical prop member 902, with the bracing members 906A, 906B installed to the prop-brace coupler 102. The bracing members 906A, 906B have corresponding channels 907 (also called connection holes) through which the plunger pins (214A, 214B) in the prop-brace coupler 102 may pass therethrough, to secure the bracing members 906 to the prop-brace coupler 102.

Figure 20:
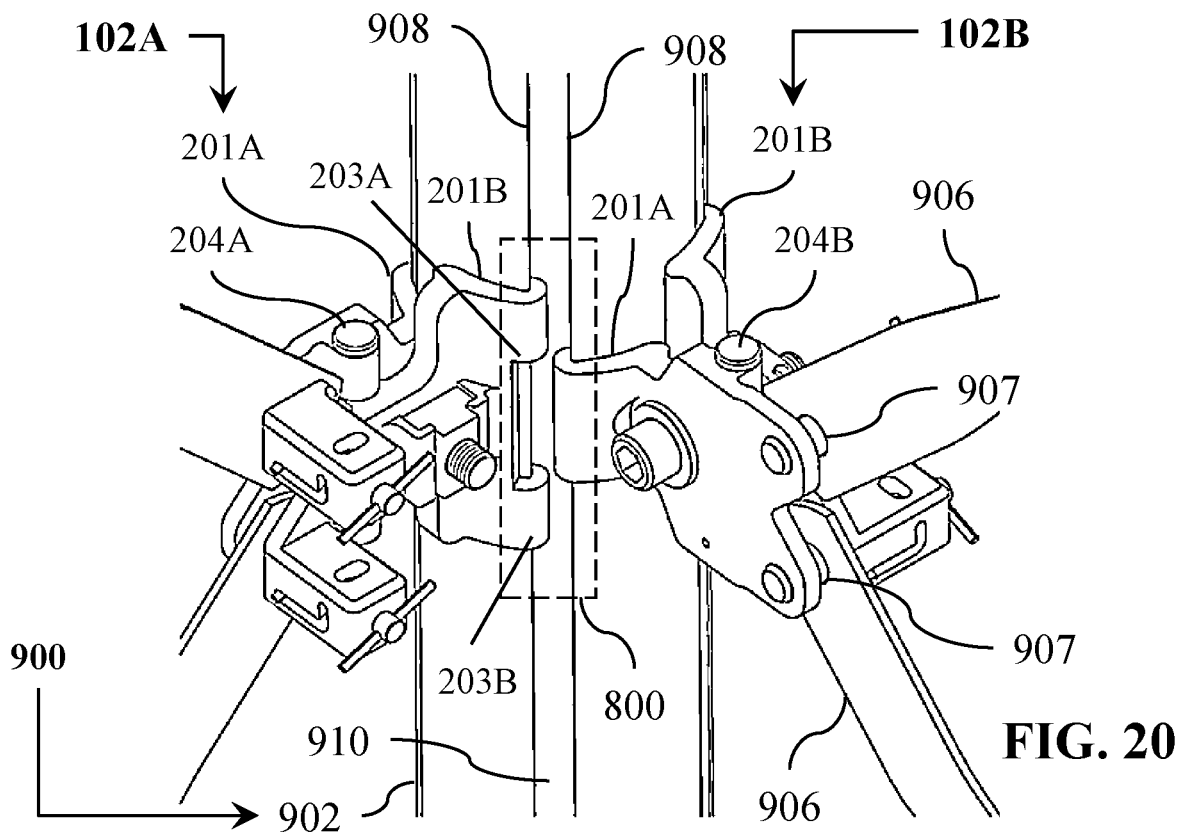
FIG. 20 is a perspective view of two prop-brace coupler attached to the construction platform.

FIG. 20 depicts a perspective view of an embodiment (implementation) of the prop-brace coupler 102 and the construction platform 900 of FIG. 1.

Referring to the embodiment (implementation) as depicted in FIG. 20, two instances of the prop-brace coupler 102 are installed to one instance of the vertical prop member 902 at the same height (that is, at the same vertical position along the height of the vertical prop member 902). The two instances of the prop-brace coupler 102 are oriented at about ninety (90) degrees to each other. The geometries of the clamp heads (201A, 201B) are configured to permit such an attachment (without interference, as shown in the dashed demonstration zone 800). For example, the second clamp head 201B of a first prop-brace coupler 102A may include upper and lower jaw members 203A, 203B (FIG. 20) that are vertically spaced from one another a distance that is equal to or substantially equal to a height of a first clamp head 201A of a second, adjacently-positioned prop-brace coupler 102B.

Figure 21:
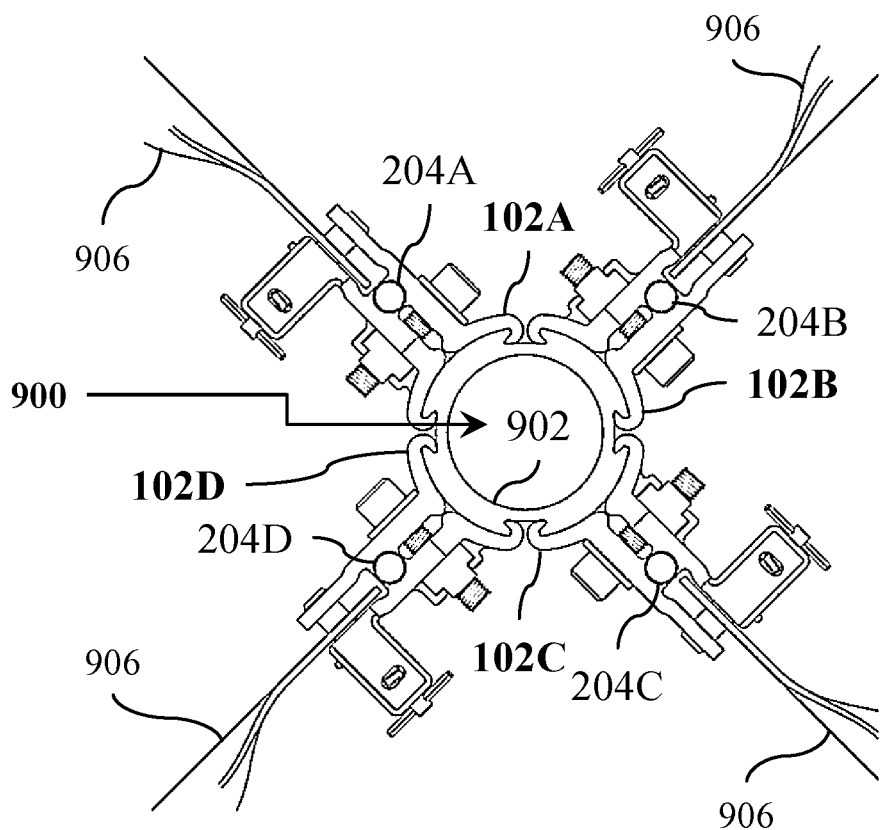
FIG. 21 is a top view illustrating a plurality of the prop-brace couplers coupled to the construction platform of FIG. 1.

FIG. 21 depicts a top view of an embodiment (implementation) of the prop-brace coupler 102 and the construction platform 900 of FIG. 1.

Referring to the embodiment (implementation) as depicted in FIG. 21, four instances of the prop-brace couplers (102A, 102B, 102C, 102D) are arranged circumferentially around the vertical prop member 902, at the same height with each prop-brace coupler 102 oriented about 90 degrees to a neighboring prop-brace coupler 102. This arrangement allows bracing members 906 to be installed to the prop-brace couplers 102 from four different directions. A single instance of the vertical prop member 902 may be braced from four different directions (preferably, at the same height along the vertical length of the vertical prop member 902) by using the prop-brace coupler 102. Depicted are the pivot members (204A, 204B, 204C, 204D).

Figure 22:
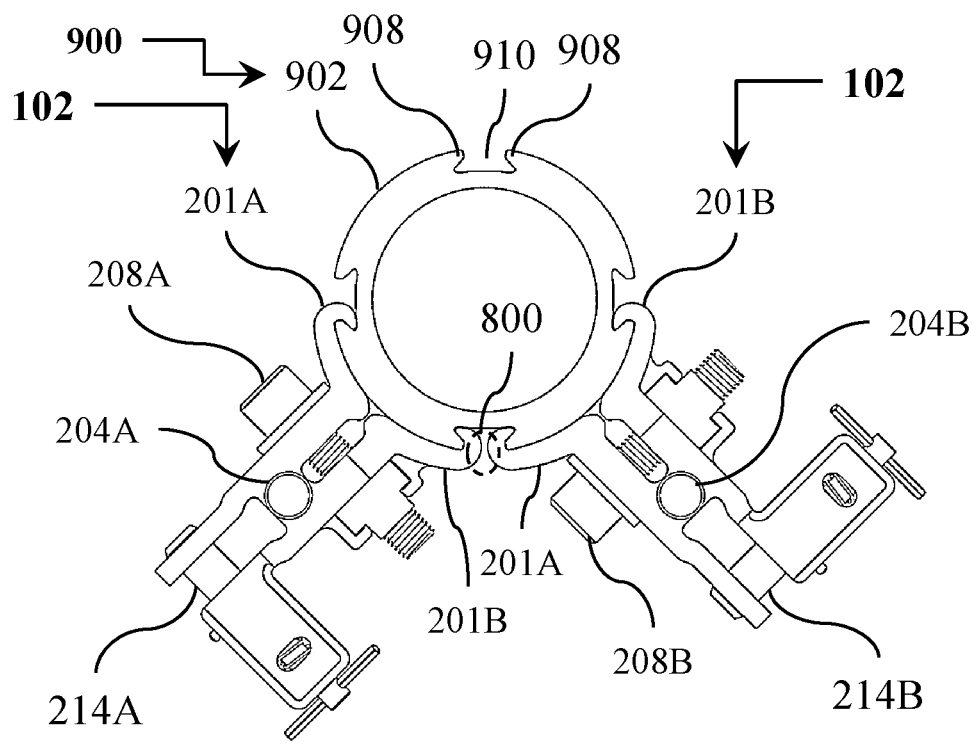
FIG. 22 is an enlarged, top view illustrating two prop-brace couplers coupled to the construction platform of FIG. 1.

FIG. 22 depicts a top view of an embodiment (implementation) of the prop-brace coupler 102 and the construction platform 900 of FIG. 1.

Referring to the embodiment (implementation) as depicted in FIG. 22, two instances of the prop-braced couplers (102A, 102B) are oriented at about ninety degrees to one another, and are installed to a single instance of the vertical prop member 902. When the prop-brace couplers (102A, 102B) are (A) installed to the vertical prop member 902, and (B) oriented about ninety (90) degrees to one another contiguously (end-to-end, at the same vertical height/position along the vertical length of the vertical prop member 902), the clearance (highlighted by the dashed demonstration zone 800), in which the clearance is located between adjacently positioned clamp heads (201A, 201B), allows the positional height (into/out of the page with respect to this specific figure) of either of the clamp heads (201A, 201B) to be adjustable by loosening the clamp bolt 208, slightly, and conveniently sliding the prop-brace couplers (102A, 102B) (up or down, etc.) without having to disengage the clamp heads (201A, 201B) completely from the vertical prop member 902 (thereby permitting fine adjustment control, etc.). Depicted are the clamp bolts (208A, 208B).

Figure 23:
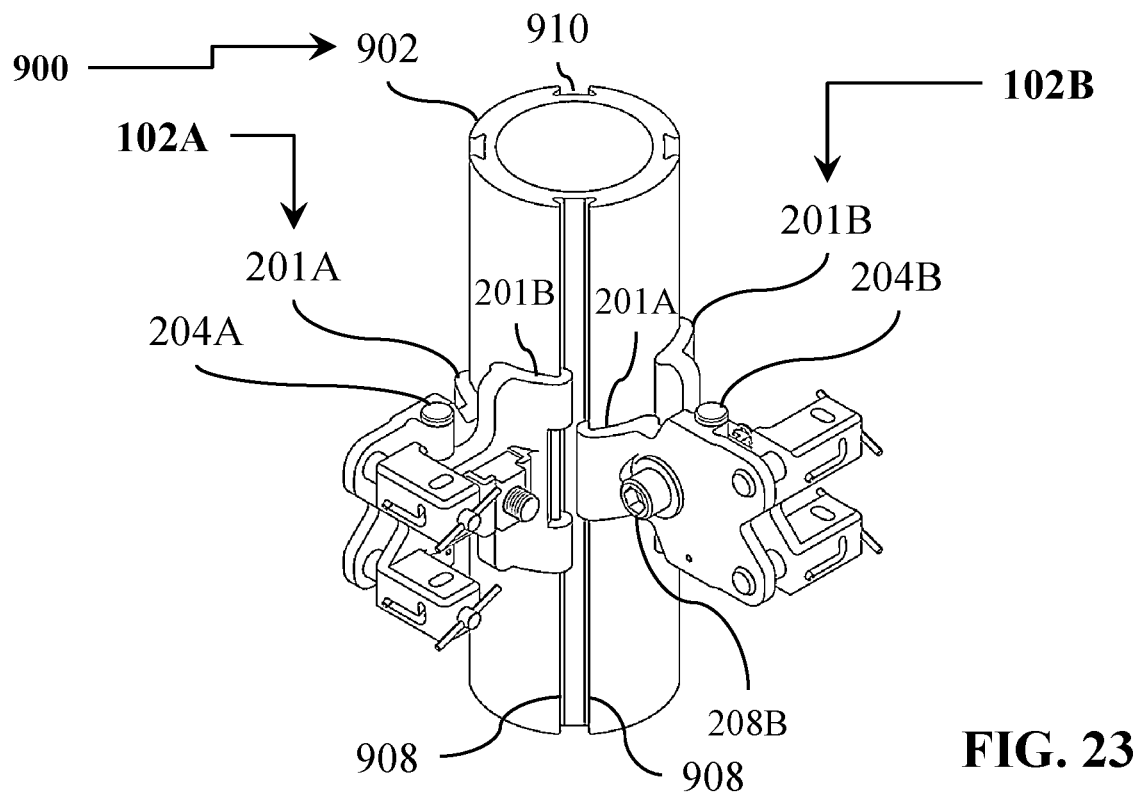
FIG. 23 is a perspective view illustrating two prop-brace couplers coupled to a vertical prop member of the construction platform of FIG. 1.
Figure 24:
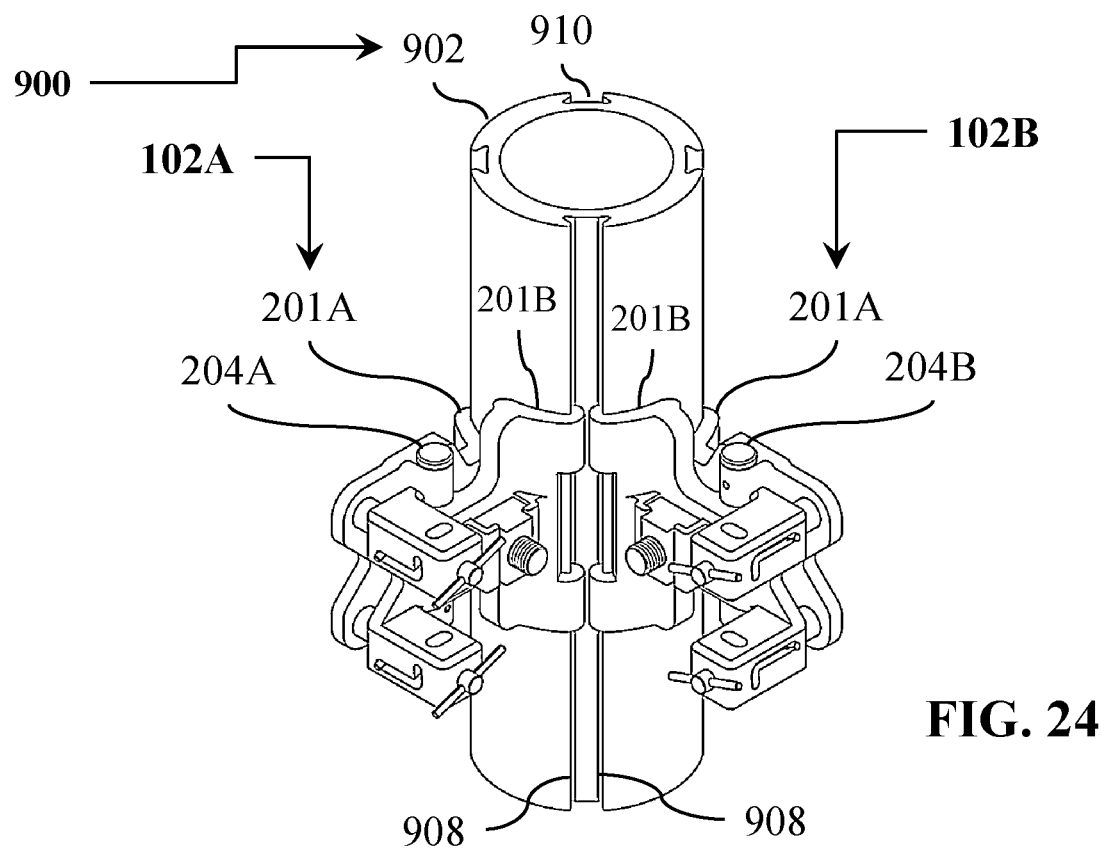
FIG. 24 is a perspective view illustrating two prop-brace couplers coupled to the vertical prop member.

FIG. 23 and FIG. 24 depict perspective views of embodiments (implementations) of the prop-brace coupler 102 and the construction platform 900 of FIG. 1.

Referring to the embodiments (implementations) as depicted in FIG. 23 and FIG. 24, the prop-brace couplers (102A, 102B) may be adjacently installed (at the same vertical position along the vertical length of the vertical prop member 902) and at about ninety (90) degrees to one another, to a single instance of the vertical prop member 902 in alternate orientations.

The following is offered as further description of the embodiments, in which any one or more of any technical feature (described in the detailed description, the summary and the claims) may be combinable with any other one or more of any technical feature (described in the detailed description, the summary and the claims). It is understood that each claim in the claims section is an open ended claim unless stated otherwise. Unless otherwise specified, relational terms used in these specifications should be construed to include certain tolerances that the person skilled in the art would recognize as providing equivalent functionality. By way of example, the term perpendicular is not necessarily limited to 90.0 degrees, and may include a variation thereof that the person skilled in the art would recognize as providing equivalent functionality for the purposes described for the relevant member or element. Terms such as "about" and "substantially", in the context of configuration, relate generally to disposition, location, or configuration that are either exact or sufficiently close to the location, disposition, or configuration of the relevant element to preserve operability of the element within the disclosure which does not materially modify the disclosure. Similarly, unless specifically made clear from its context, numerical values should be construed to include certain tolerances that the person skilled in the art would recognize as having negligible importance as they do not materially change the operability of the disclosure. It will be appreciated that the description and/or drawings identify and describe embodiments of the apparatus (either explicitly or inherently). The apparatus may include any suitable combination and/or permutation of the technical features as identified in the detailed description, as may be required and/or desired to suit a particular technical purpose and/or technical function. It will be appreciated that, where possible and suitable, any one or more of the technical features of the apparatus may be combined with any other one or more of the technical features of the apparatus (in any combination and/or permutation). It will be appreciated that persons skilled in the art would know that the technical features of each embodiment may be deployed (where possible) in other embodiments even if not expressly stated as such above. It will be appreciated that persons skilled in the art would know that other options may be possible for the configuration of the components of the apparatus to adjust to manufacturing requirements and still remain within the scope as described in at least one or more of the claims. This written description provides embodiments, including the best mode, and also enables the person skilled in the art to make and use the embodiments. The patentable scope may be defined by the claims. The written description and/or drawings may help to understand the scope of the claims. It is believed that all the crucial aspects of the disclosed subject matter have been provided in this document. It is understood, for this document, that the word "includes" is equivalent to the word "comprising" in that both words are used to signify an open-ended listing of assemblies, components, parts, etc. The term "comprising", which is synonymous with the terms "including," "containing," or "characterized by," is inclusive or open-ended and does not exclude additional, unrecited elements or method steps. Comprising (comprised of) is an "open" phrase and allows coverage of technologies that employ additional, unrecited elements. When used in a claim, the word "comprising" is the transitory verb (transitional term) that separates the preamble of the claim from the technical features of the disclosure. The foregoing has outlined the non-limiting embodiments (examples). The description is made for particular non-limiting embodiments (examples). It is understood that the non-limiting embodiments are merely illustrative as examples.

What is claimed is:

1. A prop-brace coupler, comprising:
   a first clamp head having a clamp jaw at a front section thereof;
   a second clamp head movably coupled to the first clamp head and having a clamp jaw at a front section of the second clamp head, the first and second clamp heads being configured to move relative to one another between an expanded position, in which a surface feature of a vertical prop member of a construction platform is receivable between the clamp jaws, and a clamped position, in which the surface feature of the vertical prop member is grasped between the clamp jaws, wherein each of the first and second clamp heads has a rear section configured to be selectively connected to at least one of a vertical spacing member of the construction platform or a diagonal bracing member of the construction platform; and
   further comprising at least one plunger pin movably supported on the rear section of the second clamp head and configured for receipt in at least one plunge hole defined in the rear section of the first clamp head, wherein the rear section of the second clamp head includes at least one plunger-pin housing slidably supporting the at least one plunger pin therein.

2. The prop-brace coupler according to claim 1, further comprising a clamp bolt coupled to the first and second clamp heads at a location between the front and rear sections of the first and second clamp heads, the clamp bolt being configured to selectively lock the first and second clamp heads in the clamped position.

3. The prop-brace coupler according to claim 2, wherein the clamp bolt extends perpendicularly relative to a pivot axis about which the first and second clamp heads are configured to pivot.

4. The prop-brace coupler according to claim 2, wherein the clamp jaws define an inspection opening between two proximal ends thereof when the first and second clamp heads are in the clamped position, the inspection opening being configured to permit a visual inspection of the clamp jaws to ensure that the clamp bolt is not over-tightened.

5. The prop-brace coupler according to claim 1 wherein the at least one plunger pin is configured to slide relative to the rear section of the second clamp head between a first position, in which an end of the at least one plunger pin is received in the at least one plunge hole, and a second position, in which the end of the at least one plunger pin is disposed outside of the at least one plunge hole and spaced away from the rear section of the first clamp head.

6. The prop-brace coupler according to claim 5, wherein the at least one plunger pin is resiliently biased toward the first position.

7. The prop-brace coupler according to claim 1, wherein the at least one plunger-pin housing defines a guide channel, and the at least one plunger pin has a guide pin protruding outwardly from the at least one plunger pin that is configured for slidable receipt in the guide channel, the guide pin being configured to rotate from an unlocked position, in which the at least one plunger pin is permitted to slide relative to the guide channel between the first and second positions, and a locked position, in which the at least one plunger pin is prevented from moving from the second position toward the first position.

8. The prop-brace coupler according to claim 7, wherein the at least one plunger-pin housing includes a pair of vertically-spaced plunger-pin housings extending laterally from the rear section of the second clamp head in a direction away from the rear section of the first clamp head, and the at least one plunger pin includes a pair of plunger pins respectively received in the pair of plunger-pin housings.

9. The prop-brace coupler according to claim 1, wherein the clamp jaw of the second clamp head includes upper and lower jaws vertically spaced from one another a distance substantially equal to a height of the clamp jaw of the first clamp head.

10. The prop-brace coupler according to claim 1, wherein the rear sections of the first and second clamp heads define a brace-receiver channel therebetween when the first and second clamp heads are in the clamped position.

11. A prop-brace coupler, comprising:
a first clamp head having a clamp jaw at a front section thereof;
a second clamp head movably coupled to the first clamp head and having a clamp jaw at a front section of the second clamp head, the first and second clamp heads being configured to move relative to one another between an expanded position, in which a surface feature of a vertical prop member of a construction platform is receivable between the clamp jaws, and a clamped position, in which the surface feature of the vertical prop member is grasped between the clamp jaws, wherein each of the first and second clamp heads has a rear section configured to be selectively connected to at least one of a vertical spacing member of the construction platform or a diagonal bracing member of the construction platform; and further comprising at least one plunger pin movably supported on the rear section of the second clamp head and configured for receipt in at least one plunge hole defined in the rear section of the first clamp head, wherein the at least one plunger pin includes a first plunger pin configured for receipt in at least one of a channel defined in the vertical spacing member or a channel defined in the diagonal bracing member, and a second plunger pin configured for receipt in at least one of a channel defined in another vertical spacing member or a channel defined in another diagonal bracing member.

12. The prop-brace coupler according to claim 11, wherein the at least one plunge hole includes a first plunge hole configured for removable receipt of an end of the first plunger pin, and a second plunge hole configured for removable receipt of an end of the second plunger pin.

* * * * *